US011590985B2

(12) United States Patent
Hashimoto et al.

(10) Patent No.: US 11,590,985 B2
(45) Date of Patent: Feb. 28, 2023

(54) INFORMATION PROCESSING DEVICE, MOVING BODY, INFORMATION PROCESSING METHOD, AND PROGRAM

(71) Applicant: Sony Semiconductor Solutions Corporation, Kanagawa (JP)

(72) Inventors: Hirokazu Hashimoto, Kanagawa (JP); Hideaki Imai, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/265,479

(22) PCT Filed: Jul. 24, 2019

(86) PCT No.: PCT/JP2019/028967
§ 371 (c)(1),
(2) Date: Feb. 2, 2021

(87) PCT Pub. No.: WO2020/031695
PCT Pub. Date: Feb. 13, 2020

(65) Prior Publication Data
US 2021/0300401 A1    Sep. 30, 2021

(30) Foreign Application Priority Data

Aug. 9, 2018  (JP) .............................. JP2018-150888

(51) Int. Cl.
*B60W 50/14* (2020.01)
*B60W 40/09* (2012.01)
(Continued)

(52) U.S. Cl.
CPC ............ *B60W 50/14* (2013.01); *B60W 40/09* (2013.01); *G06V 20/58* (2022.01); *G06V 20/597* (2022.01);
(Continued)

(58) Field of Classification Search
CPC ................. B60W 50/14; B60W 40/09; B60W 2540/225; B60W 2540/229;
(Continued)

(56) References Cited

U.S. PATENT DOCUMENTS

2008/0042813 A1*  2/2008  Wheatley ............... G08G 1/166
                                                        340/435
2009/0022368 A1*  1/2009  Matsuoka ............... G06F 3/013
                                                        382/103
(Continued)

FOREIGN PATENT DOCUMENTS

CN         101536057 A        9/2009
CN         101549648 A       10/2009
(Continued)

OTHER PUBLICATIONS

International Search Report and English translation thereof dated Oct. 15, 2019 in connection with International Application No. PCT/JP2019/028967.
(Continued)

*Primary Examiner* — Mohamed Barakat
(74) *Attorney, Agent, or Firm* — Wolf, Greenfield & Sacks, P.C.

(57) ABSTRACT

An information processing device includes an external information detection unit (141) that detects an object that is present outside a moving body based on data detected by an external detection unit, an internal information detection unit (142) that detects a direction of a driver's face inside the moving body based on data detected by an internal detection unit, a determination unit (155) that determines whether a position of the object detected by the external information detection unit (141) and the direction of the driver's face detected by the internal information detection unit (142) are in a same direction, and an output control unit (105) that outputs an alert to a driver more strongly when the position (Continued)

of the object is not in the same direction as the direction of the driver's face, as compared to a case where the position of the object is in the same direction as the direction of the driver's face.

10 Claims, 12 Drawing Sheets

(51) Int. Cl.
*G06V 20/58* (2022.01)
*G06V 20/59* (2022.01)

(52) U.S. Cl.
CPC . *B60W 2050/143* (2013.01); *B60W 2540/225* (2020.02); *B60W 2540/229* (2020.02)

(58) Field of Classification Search
CPC ........ B60W 2050/143; G06K 9/00805; G06K 9/00845; G06V 20/58; G06V 20/597
See application file for complete search history.

(56) References Cited

U.S. PATENT DOCUMENTS

| | | | | |
|---|---|---|---|---|
| 2009/0243880 | A1* | 10/2009 | Kiuchi | G08G 1/166 |
| | | | | 340/903 |
| 2010/0060440 | A1* | 3/2010 | Suzuki | G06T 7/73 |
| | | | | 340/435 |
| 2010/0253494 | A1 | 10/2010 | Inoue | |
| 2011/0169625 | A1* | 7/2011 | James | G08G 1/165 |
| | | | | 340/439 |
| 2013/0249684 | A1* | 9/2013 | Hatakeyama | B60K 37/02 |
| | | | | 340/435 |
| 2015/0002664 | A1 | 1/2015 | Eppinger et al. | |
| 2016/0288709 | A1* | 10/2016 | Nespolo | B60K 35/00 |
| 2017/0305342 | A1 | 10/2017 | Tomioka | |

FOREIGN PATENT DOCUMENTS

| | | |
|---|---|---|
| CN | 107963036 A | 4/2018 |
| CN | 108369780 A | 8/2018 |
| EP | 2061016 A1 | 5/2009 |
| JP | H0761257 B2 * | 7/1995 |
| JP | H07167668 A | 7/1995 |
| JP | 2015-108926 A | 6/2015 |
| JP | 2017-005726 A | 1/2017 |
| WO | WO 2008/041497 A1 | 4/2008 |

OTHER PUBLICATIONS

Written Opinion and English translation thereof dated Oct. 15, 2019 in connection with International Application No. PCT/JP2019/028967.
International Preliminary Report on Patentability and English translation thereof dated Feb. 18, 2021 in connection with International Application No. PCT/JP2019/028967.

* cited by examiner

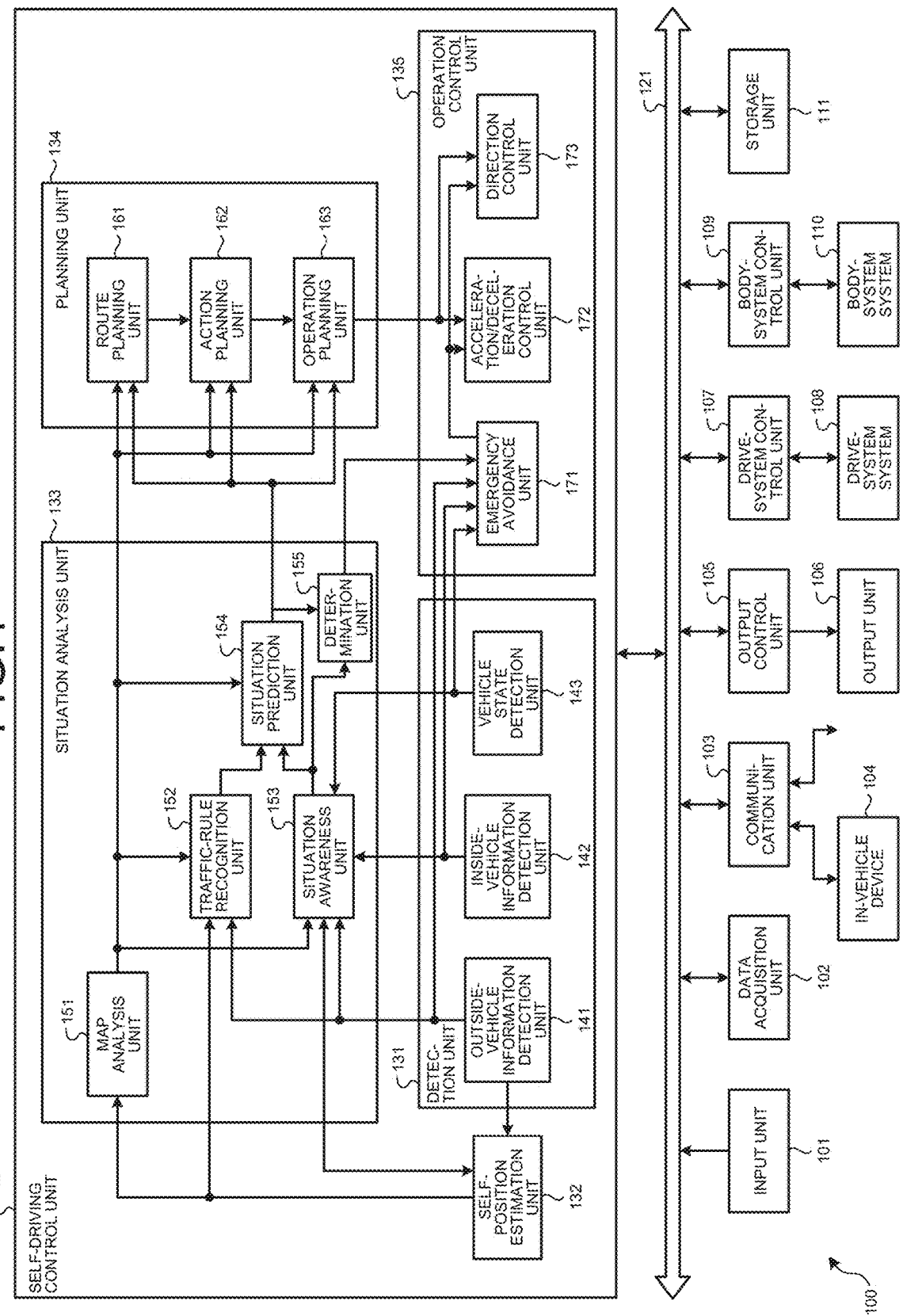

| DEGREE OF AWARENESS \ OVERALL DEGREE OF SAFETY | HIGH | MEDIUM | LOW |
|---|---|---|---|
| YES | EXTREMELY WEAK NOTIFICATION SOUND | MODEST NOTIFICATION SOUND | STRONG NOTIFICATION SOUND |
| NO | EXTREMELY WEAK NOTIFICATION SOUND | SLIGHTLY STRONGER NOTIFICATION SOUND | STRONG NOTIFICATION SOUND |

INFORMATION PROCESSING DEVICE, MOVING BODY, INFORMATION PROCESSING METHOD, AND PROGRAM

CROSS-REFERENCE TO RELATED APPLICATIONS

This is a U.S. National Stage Application under 35 U.S.C. § 371, based on International Application No. PCT/JP2019/028967, filed in the Japanese Patent Office as a Receiving Office on Jul. 24, 2019, entitled "INFORMATION PROCESSING DEVICE, MOBILE BODY, INFORMATION PROCESSING METHOD, AND PROGRAM," which claims priority under 35 U.S.C. § 119(a)-(d) or 35 U.S.C. § 365(b) to Japanese Patent Application Number JP2018-150888, filed in the Japanese Patent Office on Aug. 9, 2018, each of which applications is hereby incorporated by reference in its entirety.

FIELD

The present disclosure relates to an information processing device, a moving body, an information processing method, and a program.

BACKGROUND

Techniques have been known in which the degree of awakening of a driver while driving is determined, and when the degree of awakening is low, the volume of an alarm from a speaker is changed depending on the degree of danger indicating the possibility of a collision between obstacles around a vehicle and the vehicle.

CITATION LIST

Patent Literature

Patent Literature 1: JP 2009-116693 A

SUMMARY

Technical Problem

In the conventional technique described above, however, no processing is performed when the degree of awakening of a driver is high. For this reason, if the degree of awakening of the driver is high, but the driver is not aware of an object that may collide with a vehicle, the alarm is not notified and the driver's awareness of the object is delayed.

Therefore, the present disclosure proposes an information processing device, a moving body, an information processing method, and a program capable of changing a notification content to a driver depending on the degree to which the driver is aware of an object around a vehicle.

Solution to Problem

According to the present disclosure, an information processing device includes an external information detection unit that detects an object that is present outside a moving body based on data detected by an external detection unit, an internal information detection unit that detects a direction of a driver's face inside the moving body based on data detected by an internal detection unit, a determination unit that determines whether a position of the object detected by the external information detection unit and the direction of the driver's face detected by the internal information detection unit are in a same direction, and an output control unit that outputs an alert to a driver more strongly when the position of the object is not in the same direction as the direction of the driver's face, as compared to a case where the position of the object is in the same direction as the direction of the driver's face.

Advantageous Effects of Invention

According to the present disclosure, the notification content to the driver can be changed according to the degree to which the driver is aware of an object around a vehicle. The effects described herein are not necessarily limited and may be any effects described in the present disclosure.

BRIEF DESCRIPTION OF DRAWINGS

FIG. 1 is a block diagram illustrating an example of a schematic functional configuration of a vehicle control system that is an example of a moving body control system to which the present technique can be applied.

DESCRIPTION OF EMBODIMENTS

Figure 2A:
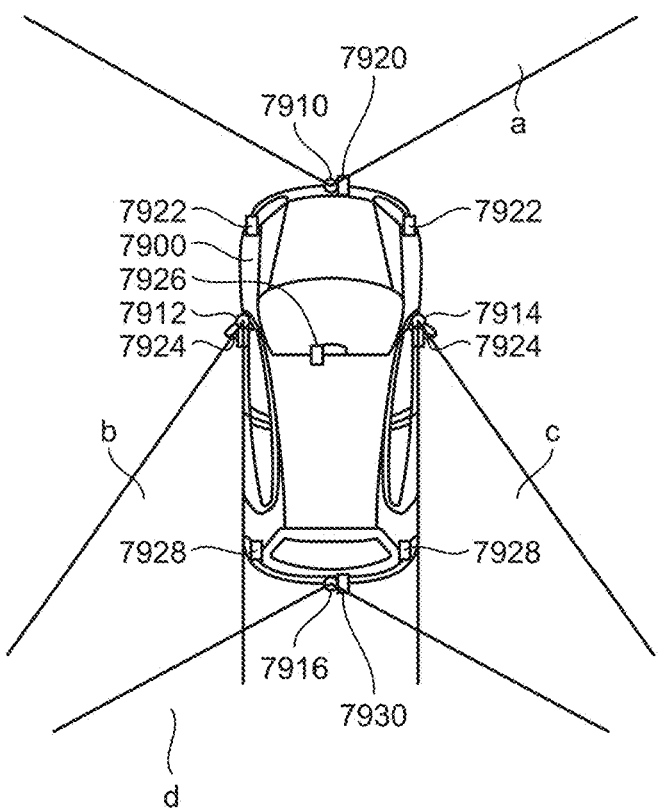
FIG. 2A is a view illustrating an example of an arrangement position of a data acquisition unit that acquires outside-vehicle information.

Hereinafter, embodiments of the present disclosure will be described in detail with reference to the drawings. In each of the following embodiments, the same reference numerals are given to the same components, and duplicate description will be omitted.

Embodiment

System Configuration According to Embodiment

FIG. 1 is a block diagram illustrating an example of a schematic functional configuration of a vehicle control system that is an example of a moving body control system to which the present technique can be applied.

Hereinafter, when distinguishing a vehicle including a vehicle control system 100 from other vehicles, the vehicle is referred to as "host vehicle" or "own vehicle".

The vehicle control system 100 includes an input unit 101, a data acquisition unit 102, a communication unit 103, an in-vehicle device 104, an output control unit 105, an output unit 106, a drive-system control unit 107, a drive-system system 108, a body-system control unit 109, a body-system system 110, a storage unit 111, and a self-driving control unit 112. The input unit 101, the data acquisition unit 102, the communication unit 103, the output control unit 105, the drive-system control unit 107, the body-system control unit 109, the storage unit 111, and the self-driving control unit 112 are connected to each other through a communication network 121. The communication network 121 includes, for example, an in-vehicle communication network or a bus that conforms to any standard such as controller area network (CAN), local interconnect network (LIN), local area network (LAN), or FlexRay (registered trademark). The respective units of the vehicle control system 100 may be directly connected to each other without using the communication network 121.

Note that, hereinafter, when each unit of the vehicle control system 100 communicates through the communication network 121, the description of the communication network 121 is omitted. For example, when the input unit 101 and the self-driving control unit 112 communicate with each other through the communication network 121, it is simply described that the input unit 101 and the self-driving control unit 112 communicate with each other. In addition, the self-driving control unit 112, the output control unit 105, the output unit 106, and the storage unit 111 correspond to an information processing device.

The input unit 101 includes a device used by a passenger to input various data or instructions. For example, the input unit 101 includes an operation device such as a touch panel, a button, a microphone, a switch, or a lever, and an operation device capable of inputting by a method using voice or gestures other than a manual operation. Further, the input unit 101 may be, for example, a remote control device that uses infrared rays or other radio waves, or an externally connected device such as a mobile device or a wearable device that supports the operation of the vehicle control system 100. The input unit 101 generates an input signal based on data or instructions input by the passenger, and supplies the input signal to each unit of the vehicle control system 100.

The data acquisition unit 102 includes various sensors that acquire data used for processing of the vehicle control system 100, and supplies the acquired data to each unit of the vehicle control system 100.

For example, the data acquisition unit 102 includes various sensors for detecting the state of a host vehicle and the like. Specifically, the data acquisition unit 102 includes, for example, a gyro sensor, an acceleration sensor, an inertial measurement unit (IMU), a sensor for detecting an accelerator pedal operation amount, a brake pedal operation amount, a steering wheel steering angle, an engine speed, a motor speed, or a wheel rotation speed, and the like.

For example, the data acquisition unit 102 also includes external detection units that are various sensors for detecting information outside the host vehicle. Specifically, the data acquisition unit 102 includes, for example, an image capturing device such as a time of flight (ToF) camera, a stereo camera, a monocular camera, an infrared camera, or other cameras. Further, the data acquisition unit 102 includes, for example, an environment sensor for detecting the weather or the climate, and a surrounding information detection sensor for detecting an object around the host vehicle. The environment sensor includes, for example, a raindrop sensor, a fog sensor, a sunshine sensor, a snow sensor, and the like. The surrounding information detection sensor includes, for example, an ultrasonic sensor, a radar, light detection and ranging, laser imaging detection and ranging (LiDAR), a sonar, and the like.

For example, the data acquisition unit 102 also includes various sensors for detecting the current position of the host vehicle. Specifically, the data acquisition unit 102 includes, for example, a GNSS receiver that receives a GNSS signal from a global navigation satellite system (GNSS) satellite and the like.

For example, the data acquisition unit 102 also includes internal detection units that are various sensors for detecting information in the vehicle. Specifically, the data acquisition unit 102 includes, for example, an image capturing device (driver monitoring system, hereinafter referred to as "DMS") that captures a driver, a biosensor that detects the biometric information of the driver, a microphone that collects voice in a vehicle interior, and the like. The biosensor is provided on, for example, a seat surface or a steering wheel, and detects biometric information of a passenger sitting on a seat or a driver who holds the steering wheel. A camera, a ToF camera, or the like can be used as the DMS. In particular, it is desirable to use a ToF camera that can monitor the driver with high accuracy even in a tunnel or in the dark at night. Alternatively, the DMS may be a line-of-sight sensor that detects the line of sight of the driver. For example, a sensor that irradiates a driver's eye with infrared rays to detect the line of sight based on the position of reflected light on a cornea and the position of a pupil can be used as the line-of-sight sensor.

Figure 2B:
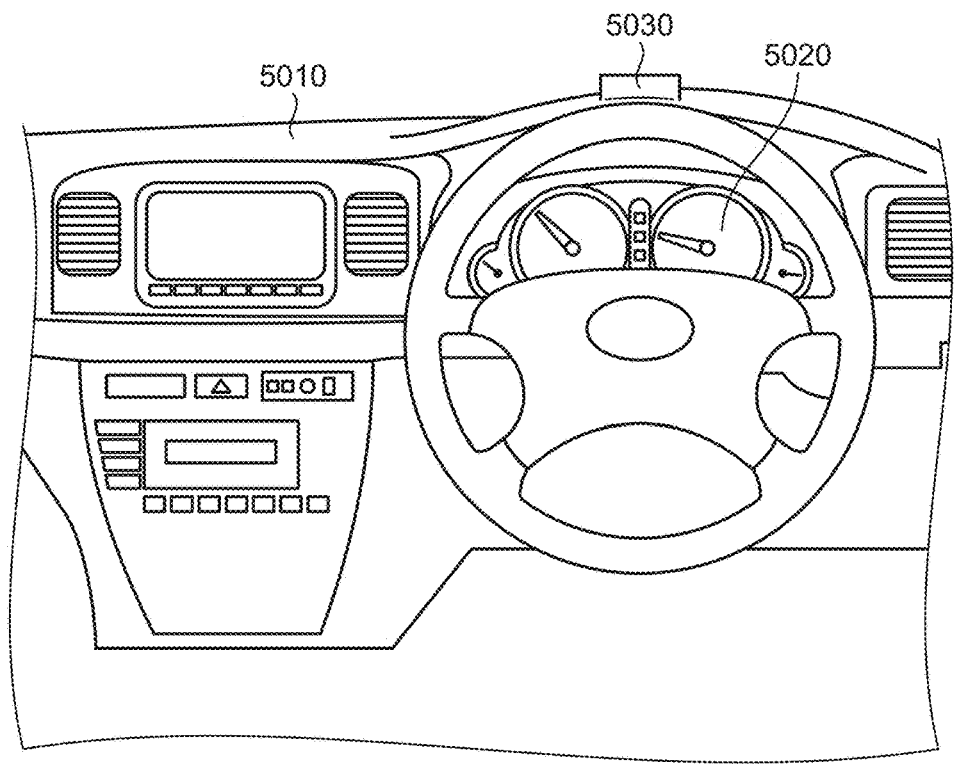
FIG. 2B is a view illustrating an example of an arrangement position of a data acquisition unit that acquires inside-vehicle information.

FIG. 2A is a view illustrating an example of an arrangement position of a data acquisition unit that acquires outside-vehicle information, and FIG. 2B is a view illustrating an example of an arrangement position of a data acquisition unit that acquires inside-vehicle information. As illustrated in FIG. 2A, image capturing devices 7910, 7912, 7914, and 7916 that capture the outside of a vehicle are provided on the front nose, side mirrors, and rear bumper of a vehicle 7900, which is a host vehicle, respectively. The image capturing device 7910 on the front nose mainly acquires an image from the front of the vehicle 7900. The image capturing devices 7912 and 7914 on the side mirrors mainly acquire images from the side of the vehicle 7900. The image capturing device 7916 on the rear bumper mainly acquires an image from the rear of the vehicle 7900. The image capturing device 7910 on the front nose may be provided on the top of a windshield. The image capturing device 7916 on the rear bumper may be provided on a back door.

FIG. 2A also illustrates an example of the image capturing ranges a to d of the respective image capturing devices 7910, 7912, 7914, and 7916. The image capturing range a indicates the image capturing range of the image capturing device 7910 on the front nose, whereas the image capturing ranges b and c indicate the image capturing ranges of the image capturing devices 7912 and 7914 on the side mirrors, respectively. In addition, the image capturing range d indicates the image capturing range of the image capturing device 7916 on the rear bumper.

Although FIG. 2A illustrates an example of the arrangement positions of the image capturing devices 7910, 7912, 7914, and 7916, outside-vehicle information detection devices 7920, 7922, 7924, 7926, 7928, and 7930 other than the image capturing devices may be arranged. For example, ultrasonic sensors or radar devices that are the outside-vehicle information detection devices 7920, 7922, 7924, 7926, 7928, and 7930 may be arranged on the front, rear, side, corner of the vehicle 7900 and on the top of the windshield inside the vehicle. Alternatively, LiDAR devices that are the outside-vehicle information detection devices 7920, 7926, and 7930 may be arranged on the front nose, rear bumper, back door of the vehicle 7900, or on the top of the windshield inside the vehicle.

As illustrated in FIG. 2B, a DMS 5030 is provided on a dashboard 5010 above an instrument panel 5020, and captures the upper body of a driver including the face of the driver seated in a driver's seat.

Returning to FIG. 1, the communication unit 103 communicates with the in-vehicle device 104 and various devices, servers, and base stations outside the vehicle, transmits data supplied from each unit of the vehicle control system 100, and supplies received data to each unit of the vehicle control system 100. The communication protocol supported by the communication unit 103 is not particularly limited, and the communication unit 103 can support a plurality of types of communication protocols.

For example, the communication unit 103 performs wireless communication with the in-vehicle device 104 via wireless LAN, Bluetooth (registered trademark), near field communication (NFC), wireless USB (WUSB), or the like. Alternatively, the communication unit 103 performs wired communication with the in-vehicle device 104 via a connection terminal (not illustrated) (and, if necessary, cable) using universal serial bus (USB), high-definition multimedia interface (HDMI) (registered trademark), or mobile high-definition link (MHL), for example.

Furthermore, the communication unit 103 communicates with a device (for example, application server or control server) on an external network (for example, Internet, cloud network, or network unique to business operator) via a base station or an access point, for example. For example, the communication unit 103 also uses peer to peer (P2P) technology to communicate with a terminal near the host vehicle (for example, terminal of pedestrian or store, or machine type communication (MTC) terminal). For example, the communication unit 103 also performs V2X communication such as vehicle-to-vehicle communication, vehicle to infrastructure communication, vehicle to home communication, or vehicle to pedestrian communication. In addition, the communication unit 103 includes, for example, a beacon receiver, and receives radio waves or electromagnetic waves transmitted from a wireless station installed on a road and acquires information such as a current position, traffic congestions, traffic restrictions, and a required time.

The in-vehicle device 104 includes, for example, a mobile device or a wearable device possessed by a passenger, an information device that is carried in or attached to a host vehicle, a navigation device that searches for a route to an arbitrary destination, and the like.

The output control unit 105 controls the output of various types of information to a driver. For example, the output control unit 105 generates an output signal including at least one of visual information (for example, image data) and auditory information (for example, voice data) and supplies the output signal to the output unit 106 to control the output of the visual and auditory information from the output unit 106. Specifically, the output control unit 105 composes image data captured by different image capturing devices in the data acquisition unit 102 to generate a bird's-eye image or a panoramic image, and supplies an output signal including the generated image to the output unit 106, for example.

For example, the output control unit 105 also generates voice data including a warning sound or a warning message that is an alert for a collision based on the degree to which the driver is aware of an object, and supplies an output signal including the generated voice data to the output unit 106. At this time, the output control unit 105 may generate image data in which an external image captured by the image capturing device of the data acquisition unit 102 is superposed with a warning display or the like that is an alert for a collision based on the degree of awareness of the driver, and supply an output signal including the generated image data to the output unit 106. The object includes an object that is moving (moving object) and a stationary object.

The output control unit 105 may generate voice data based on not only the degree of awareness of an object but also a combination of the degree of safety of surrounding objects with respect to a host vehicle and the degree to which the driver is aware of the object. At this time, the output control unit 105 may generate image data based on a combination of the degree of safety of the object and the degree of awareness of the driver in the external image.

The output unit 106 includes a device capable of outputting visual information or auditory information to the passengers of a host vehicle. For example, the output unit 106 includes a display device, an instrument panel, an audio speaker, headphones, a wearable device such as a glasses-type display worn by a passenger, a projector, a lamp, and the like. The display device included in the output unit 106 may be, in addition to a device having a normal display, for example, a head-up display, a transmissive display, or a device that displays visual information in the visual field of a driver, such as a device having an augmented reality (AR) display function.

The drive-system control unit 107 generates various control signals and supplies the control signals to the drive-system system 108 to control the drive-system system 108. The drive-system control unit 107 supplies control signals to the respective units other than the drive-system system 108 as necessary to notify the control state of the drive-system system 108 and the like.

The drive-system system 108 includes various devices related to the drive system of a host vehicle. For example, the drive-system system 108 includes a drive force generator for generating a drive force such as an internal combustion engine or a drive motor, a drive force transmission mechanism for transmitting a drive force to the wheels, a steering mechanism that adjusts a steering angle, a braking device that generates a braking force, an antilock brake system (ABS), an electronic stability control (ESC), an electric power steering device, and the like.

The body-system control unit 109 generates various control signals and supplies the control signals to the body-system system 110 to control the body-system system 110. The body-system control unit 109 supplies control signals to the respective units other than the body-system system 110 as necessary to notify the control state of the body-system system 110 and the like.

The body-system system 110 includes various body-system devices mounted on a vehicle body. For example, the body-system system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), or a hard disc drive (HDD), a semiconductor storage device, an optical storage device, a magneto-optical storage device, and the like. The storage unit 111 stores various programs and data used by the respective units of the vehicle control system 100. For example, the storage unit 111 stores map data such as a three-dimensional high-precision map such as a dynamic map, a global map that is less precise than the high-precision map and covers a large area, and a local map including information around a host vehicle.

The self-driving control unit 112 controls self-driving such as autonomous driving or driving assistance. Specifically, the self-driving control unit 112 executes cooperative control for the purpose of achieving the functions of advanced driver assistance system (ADAS) including collision avoidance or shock mitigation of a host vehicle, follow-up traveling based on an inter-vehicle distance, vehicle speed maintaining traveling, collision warning of the host vehicle, or lane departure warning of the host vehicle. For example, the self-driving control unit 112 also executes cooperative control for the purpose of self-driving, that is, autonomous travelling without depending on the operation of a driver. The self-driving control unit 112 includes a detection unit 131, a self-position estimation unit 132, a situation analysis unit 133, a planning unit 134, and an operation control unit 135.

The detection unit 131 detects various types of information necessary for controlling self-driving. The detection unit 131 includes an outside-vehicle information detection unit 141 that is an external information detection unit, an inside-vehicle information detection unit 142 that is an internal information detection unit, and a vehicle state detection unit 143.

The outside-vehicle information detection unit 141 performs a process of detecting information outside a host vehicle based on data or signals from the respective units of the vehicle control system 100. For example, the outside-vehicle information detection unit 141 performs processes of detecting, recognizing, and tracking an object around the host vehicle, and of detecting a distance to the object. Examples of an object to be detected include vehicles, people, obstacles, structures, roads, traffic lights, traffic signs, and road markings. For example, the outside-vehicle information detection unit 141 also performs a process of detecting the environment around the host vehicle. Examples of the surrounding environment to be detected include weather, temperature, humidity, brightness, and road surface condition. The outside-vehicle information detection unit 141 supplies the data indicating the results of the detection process to the self-position estimation unit 132, a map analysis unit 151, a traffic-rule recognition unit 152 and a situation awareness unit 153 in the situation analysis unit 133, an emergency avoidance unit 171 of the operation control unit 135, and the like.

The inside-vehicle information detection unit 142 performs a process of detecting information inside a vehicle based on data or signals from the respective units of the vehicle control system 100. For example, the inside-vehicle information detection unit 142 performs a process of recognizing a driver, a process of detecting the state of the driver, and the like. Examples of the state of the driver to be detected include physical conditions, the degree of awakening, concentration, fatigue, and face directions. Examples of the environment inside the vehicle to be detected include temperature, humidity, brightness, and odor. The inside-vehicle information detection unit 142 supplies the data indicating the results of the detection process to the situation awareness unit 153 of the situation analysis unit 133, the emergency avoidance unit 171 of the operation control unit 135, and the like.

The detection of the face direction by the inside-vehicle information detection unit 142 is performed by recognizing the driver's face from the captured data from the DMS of the data acquisition unit 102 using machine learning. The case of detecting the direction of the driver's face will be described below. However, since the direction of the line of sight and the face direction usually match, it is assumed that the direction of the driver's face includes the direction of the line of sight. In addition, while a camera is used as the DMS when the face direction is detected, a line-of-sight sensor is used as the DMS when the direction of the line of sight is detected.

The vehicle state detection unit 143 performs a process of detecting the condition of a host vehicle based on data or signals from the respective units of the vehicle control system 100. Examples of the state of the host vehicle to be detected include a speed, an acceleration, a steering angle, the presence or absence of an abnormality, the content of an abnormality, the state of driving operation, the position and inclination of a power seat, the state of a door lock, and states of other in-vehicle devices. The vehicle state detection unit 143 supplies the data indicating the results of the detection process to the situation awareness unit 153 of the situation analysis unit 133, the emergency avoidance unit 171 of the operation control unit 135, and the like.

The self-position estimation unit 132 performs a process of estimating the position and orientation of a host vehicle based on data or signals from the respective units of the vehicle control system 100 such as the outside-vehicle information detection unit 141 and the situation awareness unit 153 of the situation analysis unit 133. In addition, the self-position estimation unit 132 generates a local map (hereinafter referred to as "self-position estimation map") used for estimating the self-position, if necessary. The self-position estimation map is, for example, a highly precise map using technology such as simultaneous localization and mapping (SLAM). The self-position estimation unit 132 supplies the data indicating the results of the estimation process to the map analysis unit 151, the traffic-rule recognition unit 152, and the situation awareness unit 153 in the situation analysis unit 133, and the like. The self-position estimation unit 132 also stores the self-position estimation map in the storage unit 111.

The situation analysis unit 133 performs a process of analyzing the situation of a host vehicle and a surrounding situation. The situation analysis unit 133 includes the map analysis unit 151, the traffic-rule recognition unit 152, the situation awareness unit 153, a situation prediction unit 154, and a determination unit 155.

The map analysis unit 151 performs a process of analyzing various maps stored in the storage unit 111 by using, if necessary, data or signals from the respective units of the vehicle control system 100 such as the self-position estimation unit 132 and the outside-vehicle information detection unit 141 to create a map including information necessary for self-driving. The map analysis unit 151 supplies the created map to the traffic-rule recognition unit 152, the situation awareness unit 153, the situation prediction unit 154, and a route planning unit 161, an action planning unit 162, and an operation planning unit 163 in the planning unit 134.

The traffic-rule recognition unit 152 performs a process of recognizing traffic rules around a host vehicle based on data or signals from the respective units of the vehicle control system 100 such as the self-position estimation unit 132, the outside-vehicle information detection unit 141, and the map analysis unit 151. With this recognition process, for example, it is possible to recognize the position and state of a traffic light around the host vehicle, the content of traffic regulations around the host vehicle, lanes where the host vehicle can travel, and the like. The traffic-rule recognition unit 152 supplies data indicating the results of the recognition process to the situation prediction unit 154 and the like.

The situation awareness unit 153 performs a process of recognizing the situation of a host vehicle based on data or signals from the respective units of the vehicle control system 100 such as the self-position estimation unit 132, the outside-vehicle information detection unit 141, the inside-vehicle information detection unit 142, the vehicle state detection unit 143, and the map analysis unit 151. For example, the situation awareness unit 153 performs a process of recognizing the situation of the host vehicle, the situation around the host vehicle, the situation of the driver of the host vehicle, and the like.

In addition, the situation awareness unit 153 generates a local map (hereinafter referred to as "situational awareness map") used for recognizing the situation around the host vehicle and the direction of the driver's face. The situational awareness map may be, for example, an occupancy grid map or a high-precision map using technology such as SLAM. The situational awareness map is, for example, spatial information for combining the coordinate system that indicates the information outside the host vehicle acquired by the data acquisition unit 102 with the coordinate system that indicates the direction of the driver's face acquired by the data acquisition unit 102. The situational awareness map is represented by, for example, a coordinate system with the center of the rear wheel axle of the host vehicle as the origin. An object with a relative velocity to the host vehicle (hereinafter referred to as "moving object") and the direction of the driver's face that are detected by the data acquisition unit 102 are mapped to this situational awareness map.

Examples of the situation of the host vehicle to be recognized include the position, orientation, motion (for example, speed, acceleration, moving direction, and the like) of the host vehicle, the presence or absence and content of an abnormality. Examples of the situation around the host vehicle to be recognized include the types and positions of surrounding stationary objects, the types, positions, and motion (for example, speed, acceleration, moving direction, and the like) of surrounding moving objects, the layout of surrounding roads, road surface conditions, as well as the surrounding weather, temperature, humidity, brightness, and the like. Examples of the state of the driver to be recognized include physical conditions, the degree of awakening, concentration, fatigue, face directions, line-of-sight movements, and driving operations.

The situation awareness unit 153 supplies data indicating the results of the recognition process (including situational awareness map if necessary) to the self-position estimation unit 132, the situation prediction unit 154, the determination unit 155, and the like. In addition, the situation awareness unit 153 stores the situational awareness map in the storage unit 111.

The situation prediction unit 154 performs a process of predicting the situation related to a host vehicle based on data or signals from the respective units of the vehicle control system 100 such as the map analysis unit 151, the traffic-rule recognition unit 152, and the situation awareness unit 153. For example, the situation prediction unit 154 performs a process of predicting the situation of the host vehicle, the situation around the host vehicle, the situation of the driver, and the like.

Examples of the situation of the host vehicle to be predicted include the behavior of the host vehicle, the occurrence of an abnormality, and a travelable distance. Examples of the situation around the host vehicle to be predicted include the behavior of a moving object around the host vehicle, changes in traffic light states, changes in the environment such as weather. Examples of the situation of the driver to be predicted include the behavior and physical condition of the driver.

The situation prediction unit 154 supplies data indicating the results of the prediction process and the data from the traffic-rule recognition unit 152 and the situation awareness unit 153 to the determination unit 155, and the route planning unit 161, the action planning unit 162, and the operation planning unit 163 in the planning unit 134, and the like.

For example, in the present embodiment, the situation prediction unit 154 calculates the degree of safety of each moving object recognized by the situation awareness unit 153, and determines the overall degree of safety of the host vehicle (hereinafter referred to as "overall degree of safety"). The degree of safety can be classified according to the range of TTC by calculating, for example, the time until the host vehicle collides with a moving object (time to collision, hereinafter referred to as "TTC"). In the following, a case where the degree of safety is classified into three degrees of safety, that is, a low degree of safety, a medium degree of safety, and a high degree of safety will be given as an example. The low degree of safety is determined when the moving object as a determination target may collide with the host vehicle within a first period based on the time of determination, and the host vehicle collides with the moving object unless the host vehicle stops urgently or the steering wheel is operated. The medium degree of safety is determined when the moving object as a determination target may collide with the host vehicle within a second period based on the time of determination, which is not as urgent as the first period, but some processes must be performed to avoid the collision with the moving object. The high degree of safety is determined when it is determined that the moving object as a determination target may collide with the host vehicle within a third period, or when it is determined that the moving object is unlikely to collide with the host vehicle. If there is no possibility of collision, the TTC is set to be infinite, for example. For example, the first period is set to a period with a TTC of 0 seconds or more and 0.7 seconds or less, the second period is set to a period with a TTC more than 0.7 seconds and 1.4 seconds or less, and the third period is set with a TTC more than 1.7 seconds. This is only an example, and the first to third periods can be set to other ranges.

In calculating the degree of safety, the situation prediction unit 154 predicts the motion of the host vehicle and the moving object from the moving direction and speed of the moving object detected by the outside-vehicle information detection unit 141 and the moving direction, speed, and acceleration of the host vehicle detected by the vehicle state detection unit 143. As a result, the situation prediction unit 154 determines the moving object predicted to collide with the host vehicle within the first period as having a low degree of safety, the moving object predicted to collide with the host vehicle within the second period as having a medium degree of safety, and the moving object predicted to be less likely to collide with the host vehicle or predicted to collide with the host vehicle within the third period as having a high degree of safety.

The situation prediction unit 154 calculates the degree of safety of all the detected moving objects, and then determines the overall degree of safety of the moving object with respect to the host vehicle. Specifically, the situation prediction unit 154 sets the lowest degree of safety as the overall degree of safety among the degrees of safety of the moving objects. For example, the situation prediction unit 154 selects the moving body with the shortest TTC among a plurality of moving objects as a representative moving object, and sets the degree of safety of this representative moving object as the overall degree of safety. The situation prediction unit 154 outputs information about the representative moving object and the overall degree of danger to the determination unit 155 and the output control unit 105.

The determination unit 155 determines whether the driver is aware of the representative moving object based on to the position of the representative moving object with respect to the direction of the driver's face detected by the inside-vehicle information detection unit 142. The determination unit 155 determines whether or not the driver is aware of the representative moving object on the situational awareness map. For example, the determination unit 155 determines whether the position of the representative moving object is in the same direction as the face direction, and when the position of the representative moving object is in the same direction as the face direction, determines that the driver is aware of the moving object, and determines that the driver is not aware of the moving object when the position of the moving object is not in in the same direction as the face direction. In this specification, it is determined that the position of the representative moving object is in the same direction as the face direction when the representative moving object is present in a predetermined range with the face direction being the center.

Figure 3:
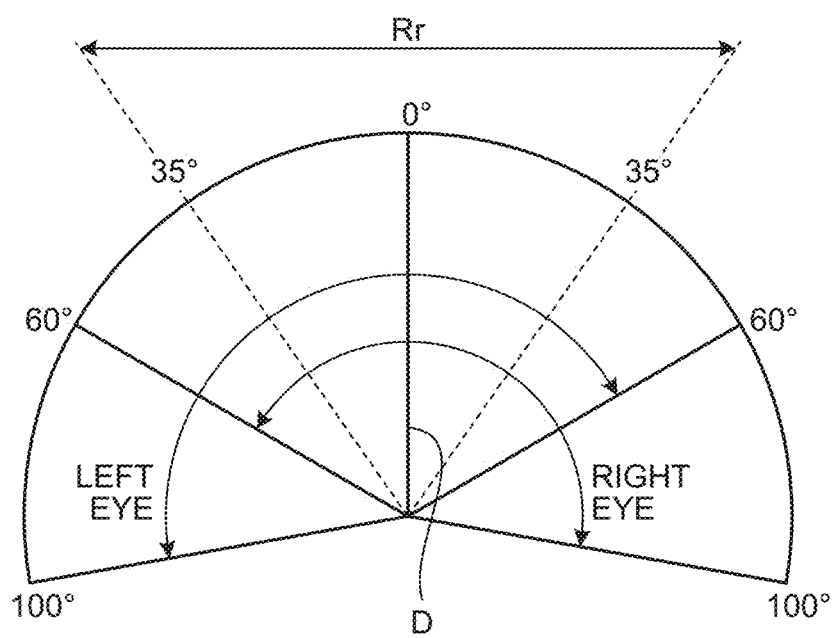
FIG. 3 is a diagram illustrating an example of the direction of a driver's face and the range of awareness.

FIG. 3 is a diagram illustrating an example of a driver's face direction and the range of recognition. As illustrated in FIG. 3, it is generally believed that human beings can check the color of a moving object that is present in the range of ±35 degrees around a face direction D, that is, the range of 70 degrees as a whole. Consequently, in the present embodiment, the range of ±35 degrees around the driver's face direction D, that is, the range of 70 degrees in total is defined as a range of recognition $R_r$, and it is assumed that when a moving object is present in the range of recognition $R_r$, the driver is aware of the moving object. Consequently, as an example, the determination unit 155 can determine whether or not the driver is aware of the representative moving object (hereinafter, also referred to as "degree of awareness") by determining whether or not the representative moving object is present in the range of recognition $R_r$ of ±35 degrees around the face direction D on the situational awareness map.

The determination unit 155 outputs the degree to which the driver is aware of the representative moving object to the emergency avoidance unit 171 and the output control unit 105. The output control unit 105 outputs output information based on a combination of the overall degree of safety and the degree to which the driver is aware of the representative moving object to the output unit 106.

For example, the output control unit 105 causes an audio speaker, which is the output unit 106, to output voice data including the notification content about the representative moving object. Further, the output control unit 105 may display image data around the host vehicle in which the representative moving object is highlighted on a display device that is the output unit 106.

In addition, after the notification content is output from the output unit 106, the determination unit 155 outputs an instruction to stop the output of the notification content to the output control unit 105 at a predetermined timing. When receiving the instruction to stop the output of the notification content at a predetermined timing, the output control unit 105 stops the output of the notification content to the output unit 106. For example, the predetermined timing may be when the driver's face direction detected by the inside-vehicle information detection unit 142 is directed to the direction of the representative moving object. Alternatively, the predetermined timing may be when the data acquisition unit 102 detects a voice indicating that the driver is aware of the representative moving object. Further, the predetermined timing may also be when the vehicle state detection unit 143 detects a steering wheel operation or a brake operation by the driver. As the notification content is stopped at a predetermined timing, it is possible to reduce the driver's annoyance at the notification.

The planning unit 134 creates a plan for the movement of a host vehicle based on the results of analysis of the host vehicle and the surrounding situation. The planning unit 134 includes the route planning unit 161, the action planning unit 162, and the operation planning unit 163.

The route planning unit 161 plans a route to a destination based on data or signals from the respective units of the vehicle control system 100 such as the map analysis unit 151 and the situation prediction unit 154. For example, the route planning unit 161 sets a route from the current position to a designated destination based on a global map. In addition, for example, the route planning unit 161 appropriately changes the route based on the state of traffic cognitions, accidents, traffic regulations, and constructions, and the physical condition of a driver. The route planning unit 161 supplies data indicating the planned route to the action planning unit 162 and the like.

The action planning unit 162 plans the action of a host vehicle to allow the host vehicle to safely travel on the route planned by the route planning unit 161 within a planned time, based on data or signals from the respective units of the vehicle control system 100 such as the map analysis unit 151 and the situation prediction unit 154. For example, the action planning unit 162 plans starting, stopping, a traveling direction (for example, forward, backward, left turn, right turn, direction change, and the like), a driving lane, a traveling speed, and overtaking. The action planning unit 162 supplies data indicating the planned action of the host vehicle to the operation planning unit 163 and the like.

The operation planning unit 163 plans the operation of a host vehicle to perform the action planned by the action planning unit 162 based on data or signals from the respective units of the vehicle control system 100 such as the map analysis unit 151 and the situation prediction unit 154. For example, the operation planning unit 163 plans acceleration, deceleration, a traveling track, and the like. The operation planning unit 163 supplies data indicating the planned operation of the host vehicle to an acceleration/deceleration control unit 172 and a direction control unit 173 in the operation control unit 135.

The operation control unit 135 controls the operation of a host vehicle. The operation control unit 135 includes the emergency avoidance unit 171, the acceleration/deceleration control unit 172, and the direction control unit 173.

Based on the results of detection of the outside-vehicle information detection unit 141, the inside-vehicle information detection unit 142, and the vehicle state detection unit 143, the emergency avoidance unit 171 performs a process of detecting an emergency such as entry into a dangerous zone, an abnormality of a driver, and an abnormality of a vehicle. The emergency avoidance unit 171 also performs a process of detecting an emergency such as a collision and a contact based on the results of determination by the determination unit 155. Specifically, when acquiring information of a low degree of safety from the situation awareness unit 153, the emergency avoidance unit 171 detects an emergency regarding a collision of a moving object with a host vehicle. When detecting the occurrence of an emergency, the emergency avoidance unit 171 plans the operation of the host vehicle to avoid the emergency such as a sudden stop or a sharp turn. The emergency avoidance unit 171 supplies data indicating the planned operation of the host vehicle to the acceleration/deceleration control unit 172, the direction control unit 173, and the like.

The acceleration/deceleration control unit 172 executes acceleration/deceleration control in order to perform the operation of a host vehicle planned by the operation planning unit 163 or the emergency avoidance unit 171. For example, the acceleration/deceleration control unit 172 calculates a control target value of a drive force generator or a braking device in order to achieve the planned acceleration, deceleration, or sudden stop, and supplies a control command indicating the calculated control target value to the drive-system control unit 107.

The direction control unit 173 executes directional control in order to perform the operation of a host vehicle planned by the operation planning unit 163 or the emergency avoidance unit 171. For example, the direction control unit 173 calculates a control target value of a steering mechanism in order to achieve a traveling track or a sharp turn planned by the operation planning unit 163 or the emergency avoidance unit 171, and supplies a control command indicating the calculated control target value to the drive-system control unit 107.

Procedure of Information Processing According to Embodiment

Figure 4:
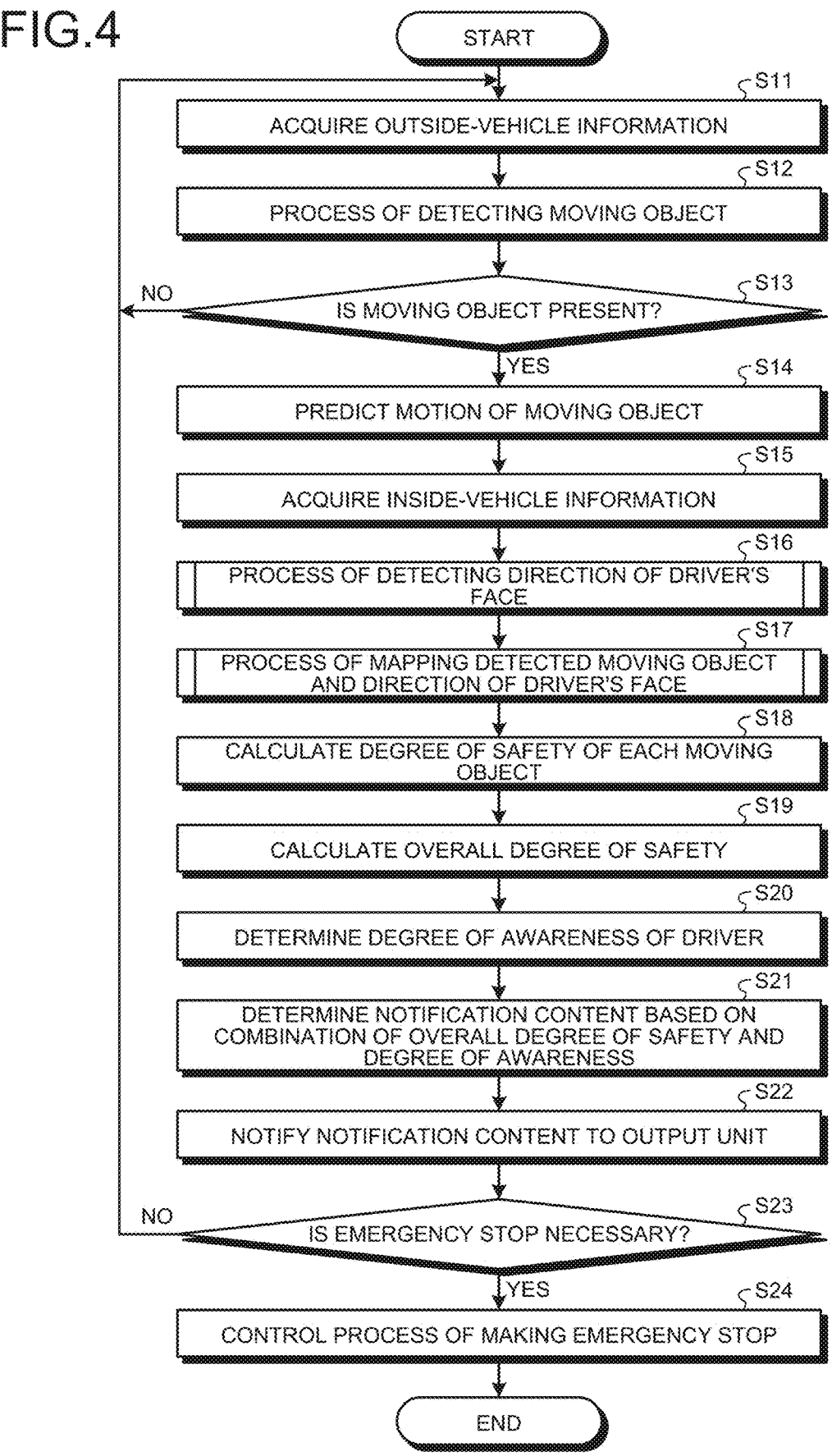
FIG. 4 is a flowchart illustrating an example of processing in an information processing method according to an embodiment of the present disclosure.

Next, an information processing method in such a vehicle control system 100 will be described. FIG. 4 is a flowchart illustrating an example of processing in an information processing method according to the embodiment of the present disclosure. First, when a host vehicle becomes operable, the outside-vehicle information detection unit 141 acquires outside-vehicle information outside the host vehicle from the data acquisition unit 102 (Step S11). The data acquisition unit 102 that detects the outside-vehicle information is, for example, an image capturing device or a surrounding information detection sensor. Further, the operable state is, for example, a state where the engine is started or a state where the power is turned on.

The outside-vehicle information detection unit 141 performs a process of detecting a moving object that is an object with a relative velocity to the host vehicle (Step S12) using the outside-vehicle information, and determines whether or not the moving object is present as a result of the detection process (Step S13). The outside-vehicle information detection unit 141 determines whether or not the moving object is present by using, for example, captured data captured at different times. If no moving object is present (No at Step S13), the process returns to Step S11.

If the moving object is present (Yes at Step S13), the situation awareness unit 153 predicts the motion of the detected moving object using the outside-vehicle information acquired from the data acquisition unit 102 (Step S14). Examples of the motion of the moving object include the current position (position at time of detection), a speed, and a moving direction relative to the host vehicle.

The inside-vehicle information detection unit 142 then acquires inside-vehicle information from a DMS that is the data acquisition unit 102 (Step S15). The DMS is, for example, a camera that captures an area including a driver's face, and the inside-vehicle information is captured data of the driver who drives the vehicle. Next, the inside-vehicle information detection unit 142 performs a process of detecting a driver's face direction using the inside-vehicle information (Step S16).

Figure 5:
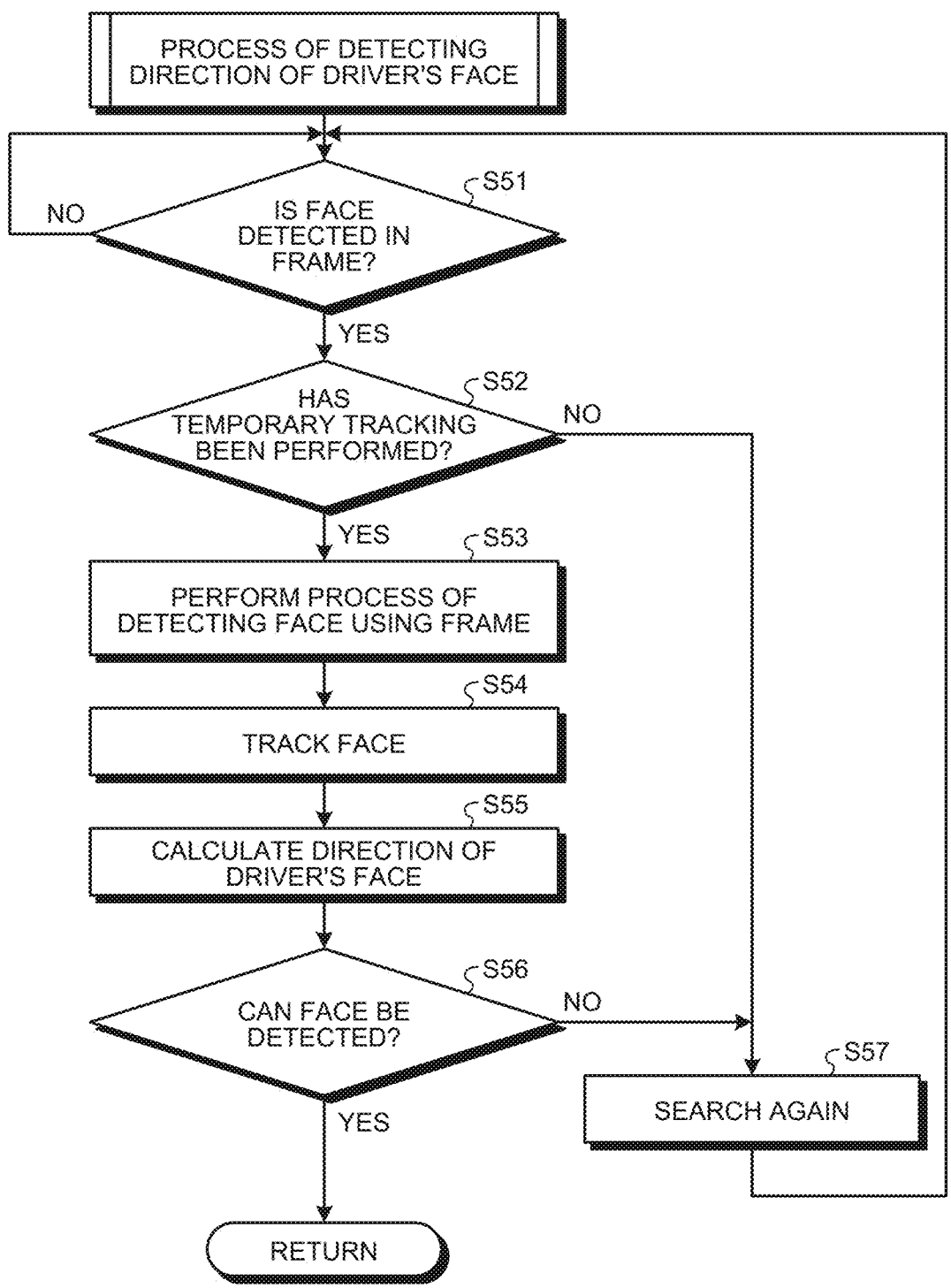
FIG. 5 is a flowchart illustrating an example of a process procedure for detecting the direction of a driver's face.

FIG. 5 is a flowchart illustrating an example of a process procedure for detecting the direction of a driver's face. The inside of the vehicle is captured by the DMS disposed inside the vehicle. The DMS is disposed at a position where the area including the driver's face can be captured. The inside-vehicle information detection unit 142 determines whether or not the face is detected in the frame captured by the DMS (Step S51). If the face is not detected in the frame (No at Step S51), the process waits until the face is detected.

When the face is detected in the frame (Yes at Step S51), the inside-vehicle information detection unit 142 determines whether or not temporary tracking has been performed (Step S52). In temporary tracking, the face is detected in a frame sent from the DMS after the frame in which the face has been detected. If temporary tracking has not been performed (No at Step S52), that is, if the face is lost in the frame during temporary tracking, search is performed again (Step S57). The process then returns to Step S51.

On the other hand, if temporary tracking has been performed (Yes at Step S52), the inside-vehicle information detection unit 142 performs face detection using the frame acquired thereafter (Step S53). In addition, the inside-vehicle information detection unit 142 tracks the driver's face with the acquired frame (Step S54). In tracking, the driver's face is identified by using information such as the arrangement relationship of parts of the detected driver's face, even when the direction of the driver's face with respect to the DMS changes.

Further, the inside-vehicle information detection unit 142 calculates the direction of the driver's face using the information of the identified driver's face (Step S55). As in the case of tracking, the inside-vehicle information detection unit 142 identifies the face direction based on the arrangement relationship of the parts of the driver's face detected in the frame using the state where the driver sits in a driver's seat and looks straight ahead as a reference. For example, since the face can be rotated around an axis extending in a vertical direction, an axis extending in a horizontal direction, and an axis extending in a front-back direction, the face direction can be identified using a rotation angle around each axis.

After that, the inside-vehicle information detection unit 142 determines whether the driver's face cannot be detected during tracking (Step S56). If the face can be detected (Yes at Step S56), the process returns to FIG. 4. If the face cannot be detected (No at Step S56), the process proceeds to Step S57, and the search is performed again. The above processing is performed while the image data of the driver is captured by the data acquisition unit 102.

Figures 6, 7:
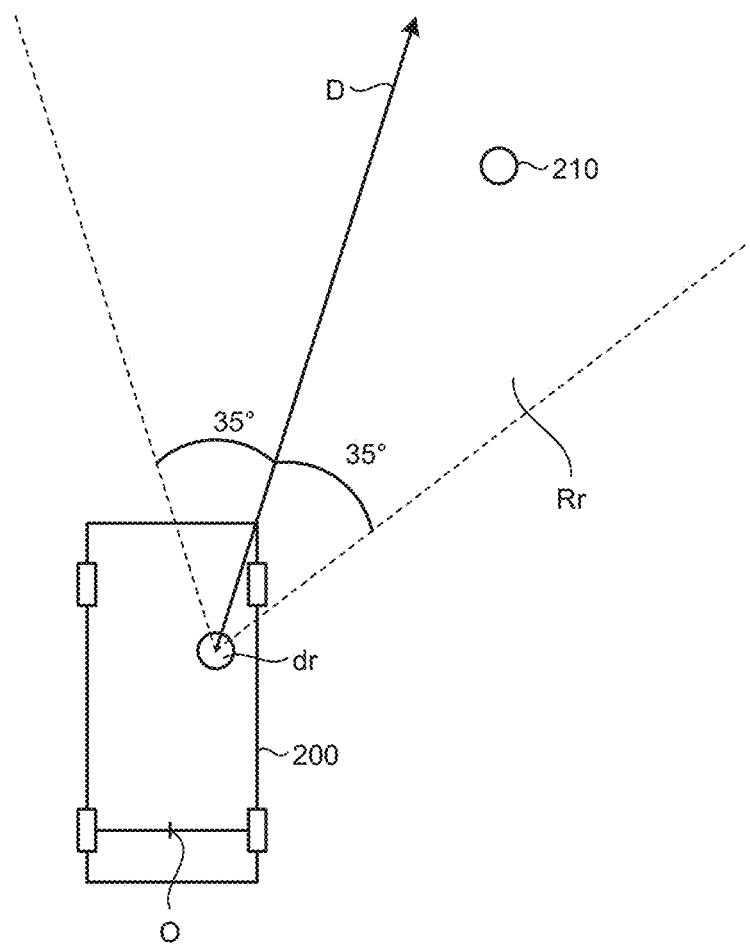
FIG. 6 is a diagram illustrating an example of a situational awareness map in the information processing method according to the embodiment.
FIG. 7 is a table illustrating an example of a notification content and a combination of the overall degree of safety and the degree of awareness of a driver according to the embodiment.

Returning to FIG. 4 again, the situation awareness unit 153 performs a process of mapping the moving object detected at Step S13 and the direction of the driver's face detected at Step S16 (Step S17). In this mapping process, for example, the moving object and the direction of the driver's face are mapped to a situational awareness map that is spatial information based on a predetermined position of the host vehicle. The predetermined position is, for example, the center of the rear wheel axle of the host vehicle. The coordinate system for detecting the moving object and the coordinate system for detecting the direction of the driver's face are different from each other, and the situation awareness unit 153 maps the data acquired in the two different coordinate systems into one coordinate system. FIG. 6 is a diagram illustrating an example of a situational awareness map in the information processing method according to the embodiment. As illustrated in this diagram, for example, the position of a moving object 210 and a face direction D of a driver dr are mapped to a situational awareness map having a coordinate system with a center O of a rear wheel axle of a vehicle as a reference.

Next, the situation prediction unit 154 calculates the degree of safety of all the moving objects mapped to the situational awareness map (Step S18). Here, the situation prediction unit 154 calculates the degree of safety indicating the degree to which the host vehicle collides with the moving object by using the motion of the moving object predicted at Step S14 and the motion of the host vehicle predicted from the information obtained by the vehicle state detection unit 143. If there are a plurality of moving objects, the degree of safety is calculated for each moving object. For example, the situation prediction unit 154 predicts the motion of the moving object based on the position, speed, and moving direction of one moving object at the time point when the calculation is performed on the moving object. In addition, the situation prediction unit 154 predicts the motion of the host vehicle based on the speed, acceleration, and moving direction of the host vehicle from the vehicle state detection unit 143. Next, the situation prediction unit 154 determines whether or not the host vehicle will collide with the moving object, and if it is predicted that the host vehicle will collide with the moving object, the situation prediction unit 154 calculates a TTC, and classifies the degree of safety as a high degree of safety, a medium degree of safety, or a low degree of safety depending on the range to which the TTC belongs. For example, if it is predicted that the host vehicle will not collide with the moving object, or if the TTC is in a third period, the situation prediction unit 154 classifies the degree of safety as a high degree of safety. When the TTC is in a second period, the situation prediction unit 154 classifies the degree of safety as a medium degree of safety, and when the TTC is in a first period, the situation prediction unit 154 classifies the degree of safety as a low degree of safety.

After the degree of safety is calculated for all the moving objects, the situation prediction unit 154 calculates the overall degree of safety (Step S19). Specifically, the situation prediction unit 154 selects the moving object with the shortest TTC among the calculated degrees of safety as a representative moving object, and sets the degree of safety of this representative moving object as the overall degree of safety. The TTC is the time until a collision, as described above. For this reason, selecting the moving object with the shortest TTC means selecting the moving object that may collide first, which is the subject that the driver must pay the most attention to. In other words, selecting the moving object with the shortest TTC makes it easier to draw the driver's attention by narrowing down one moving body that may cause a collision soon. The situation prediction unit 154 passes the calculated overall degree of safety and the degree of safety of the representative moving object to the output control unit 105 and the determination unit 155.

The determination unit 155 then determines the degree to which the driver is aware of the representative moving object by determining whether the position of the representative moving object matches the direction of the driver's face using the situational awareness map in which the degree of safety of the representative moving object and the direction of the driver's face are mapped (Step S20). Specifically, the determination unit 155 determines whether the representative moving object is present within the range of recognition $R_r$ of the driver on the situational awareness map. As illustrated in FIG. 3, the range of recognition $R_r$ of the driver is, for example, the range of ±35 degrees around the driver's face direction D. When the representative moving object is present within the range of recognition, the determination unit 155 assumes that the driver is aware of the representative moving object. When the representative moving object is not present within the range of recognition, the determination unit 155 assumes that the driver is not aware of the representative moving object. The determination unit 155 passes the degree of awareness of the driver to the output control unit 105 and the emergency avoidance unit 171.

Next, the output control unit 105 determines a notification content to the output unit 106 based on a combination of the overall degree of safety and the degree of awareness of the driver (Step S21). FIG. 7 is a table illustrating an example of the notification content and a combination of the overall degree of safety and the degree of awareness of a driver according to the embodiment. In this table, the degree of safety is classified into three categories, that is, "high", "medium", and "low", the degree of awareness is classified into two categories, that is, "yes" indicating that a driver is aware of a moving object and "no" indicating that the driver is not aware of the moving object, and the notification content is set for each combination. The method of notifying a notification sound is illustrated as the notification content. It is only required that the notification content may be an alert to the driver, and a notification with a haptic or a light may be used in addition to the notification sound.

In the case of a high degree of safety, an extremely weak notification sound is output from an audio speaker that is the output unit 106, regardless of the degree of awareness. When the degree of safety is medium and the degree of awareness is "Yes", a modest notification sound is output from the audio speaker. When the degree of safety is medium and the degree of awareness is "No", a slightly stronger notification sound is output from the audio speaker. In the case of a low degree of safety, an extremely strong notification sound is output from the audio speaker regardless of the degree of awareness.

In the case of a low degree of safety, an extremely strong notification sound is output regardless of the degree of awareness, and thus it is possible to give an alarm notification to the driver when the possibility of a collision is imminent. Regarding the notification sound, the sound becomes stronger in the order of "extremely weak", "modest", "slightly strong", and "strong", and the sound intensity is arbitrarily set within the range satisfying this relationship.

As described above, by changing the notification sound according to a combination of the overall degree of safety and the degree of awareness of the driver, it is possible to avoid unnecessary attention to the driver or oversight of moving objects to be noted. As a result, when the driver is aware of a moving object with a high degree of safety or a medium degree of safety, it is possible to draw attention to the driver while minimizing the annoyance given to the driver. In addition, when the driver is not aware of the moving object with the medium degree of safety or when the degree of safety is low, it is possible to draw strong attention to the driver.

The output control unit 105 notifies the determined notification content to the output unit 106 (Step S22). The output unit 106 notifies according to the notification content.

In addition, the emergency avoidance unit 171 determines whether an emergency stop is necessary based on the overall degree of safety acquired from the determination unit 155 (Step S23). For example, the emergency avoidance unit 171 determines that an emergency stop is necessary when the acquired overall degree of safety is low, and determines that an emergency stop is not necessary when the acquired overall degree of safety is high or medium.

If no emergency stop is necessary (No at Step S23), the process returns to Step S11. If an emergency stop is necessary (Yes at Step S23), the emergency avoidance unit 171 generates an instruction to stop the host vehicle in an emergency and passes the generated instruction to the acceleration/deceleration control unit 172 or the like. The acceleration/deceleration control unit 172 performs a control process of making an emergency stop on the drive-system control unit 107 based on the instruction (Step S24). As a result, the drive-system control unit 107 instructs the drive-system system 108 to make an emergency stop, and the host vehicle makes an emergency stop. The process is thus completed.

Figure 8:
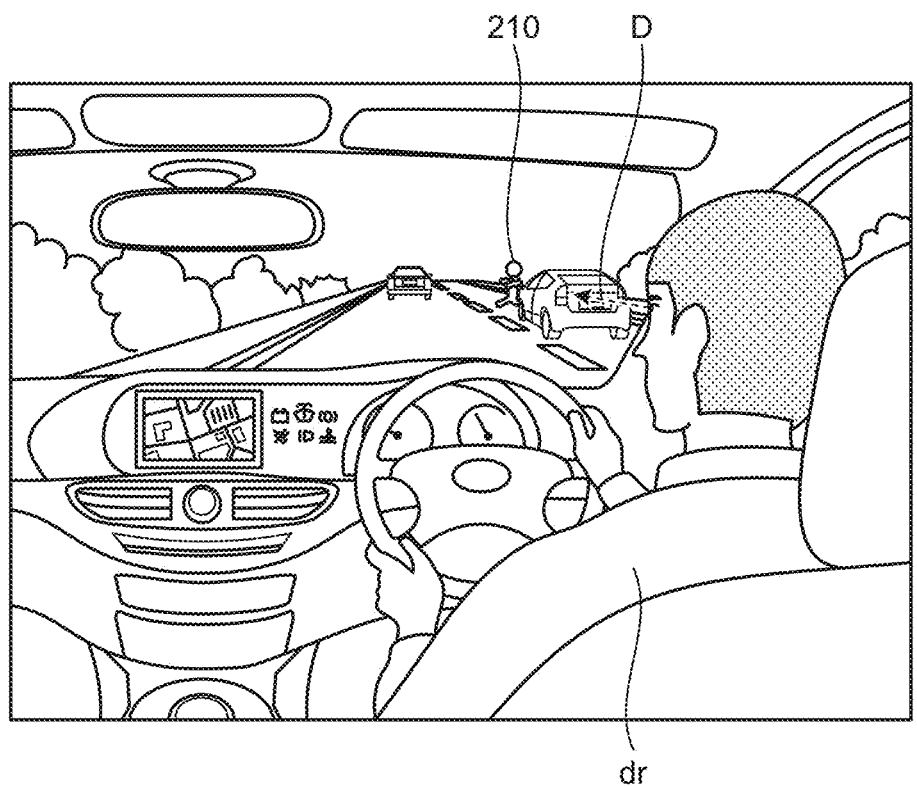
FIG. 8 is a view schematically illustrating an example of the direction of a driver's face.

FIG. 8 is a view schematically illustrating an example of the direction of a driver's face. As illustrated in this figure, the face direction D of the driver dr is outward through a windshield. In this case, the moving object 210 (representative moving object) detected by the outside-vehicle information detection unit 141 and the face direction D of the driver dr detected by the inside-vehicle information detection unit 142 are mapped to the situational awareness map illustrated in FIG. 6 by the situation awareness unit 153. The determination unit 155 determines the degree to which the driver is aware of the representative moving object, and determines the notification content according to a combination of the overall degree of safety of the representative moving object and the degree of awareness of the driver.

When the driver is looking out through the windshield or a side glass, it is possible to use a method of notifying the presence of a moving object by sound. In this case, as illustrated in FIG. 7, the sound intensity is changed depending on a combination of the overall degree of safety and the degree of awareness of the driver.

At this time, in addition to the notification sound, the output control unit 105 can also perform additional notifications such as displaying the representative moving object in the image acquired by the data acquisition unit 102 on a display unit in the vehicle by surrounding the representative moving object with a frame line. For example, when the representative moving object is selected, the output control unit 105 may output an image in which information indicating the position of the representative moving object is added to the image data of the representative moving object to the display device in the vehicle.

Figure 9:
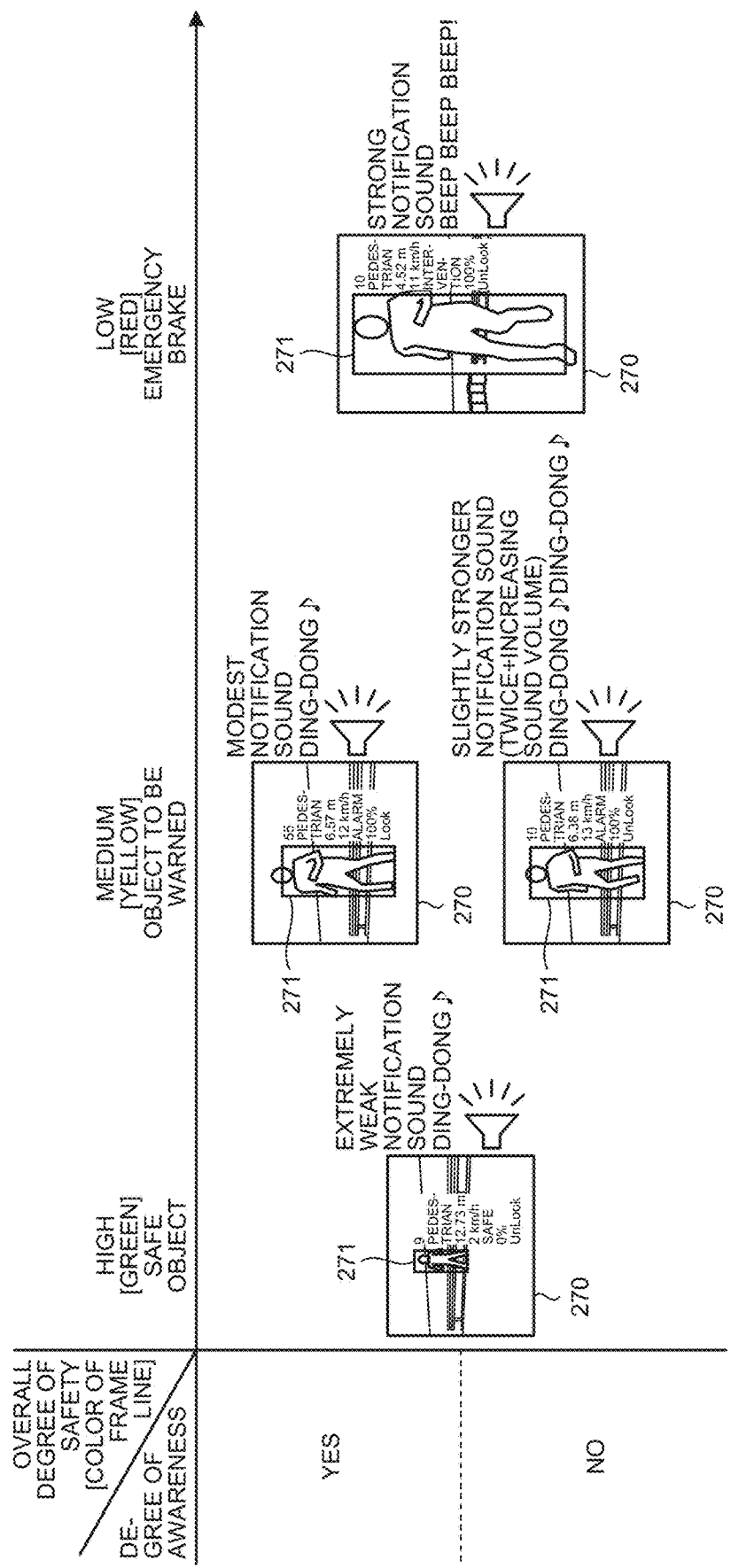
FIG. 9 is a chart illustrating an example of a notification method and a combination of the overall degree of safety and the degree of awareness of a driver according to the embodiment.

FIG. 9 is a chart illustrating an example of a notification method and a combination of the overall degree of safety and the degree of awareness of a driver according to the embodiment. Here, the notification content to a display device is added to the notification content by sound illustrated in FIG. 7. Here, the case where a representative moving object is present ahead of a vehicle is illustrated. Image data 270 captured by a front camera is projected on the display device, and the representative moving object is displayed surrounded by a frame line 271 in the image data 270. The driver checks the image data 270 of the display device when the driver hears the sound indicating the notification content, and thus the driver can check the position of the representative moving object with respect to the host vehicle.

The output control unit 105 can change the color of the frame line 271 according to the degree of safety. For example, in the case of a high degree of safety, the color of the frame line 271 can be green, in the case of a medium degree of safety, the color of the frame line 271 can be yellow, and in the case of a low degree of safety, the color of the frame line 271 can be red. It is needless to mention that this is only an example and other colors can be used. Alternatively, the type of the frame line 271 and the thickness of the frame line 271 can be changed according to the degree of safety. In addition, the frame line 271 can be blinked. Further, the information indicating the position of the representative moving object may be an arrow or the like instead of the frame line 271.

Further, in the above example, the notification sound output from the audio speaker has no directionality, but the directionality can be added. The output control unit 105 may perform a sound image localization process on the notification sound so that the sound image is placed at the position of the representative moving object as viewed from the driver based on the position of the representative moving object acquired from the outside-vehicle information detection unit 141, and may output the processed notification sound from the audio speaker in the vehicle. By outputting the notification sound subjected to the sound image localization process from the audio speaker as described above, the driver can be aware of a moving object to be noted at the position of the sound image.

As described above, in the embodiment, the position of a representative moving object that is present outside a vehicle is detected, the face direction of a driver inside the vehicle is detected, whether or not the representative moving object is present in the direction of the driver's face is determined, and then the notification content to the driver is selected. Consequently, when the representative moving object is not present in the direction of the driver's face, a notification is given, for example, a stronger notification sound as compared with the case where the representative moving object is present in the direction of the driver's face is output. As a result, when the representative moving object is present in the direction of the driver's face, the notification is given so as not to bother the driver, but when the representative moving object is not present in the direction of the driver's face, the notification is given so as to draw attention to the driver.

In determining whether or not the representative moving object is present in the direction of the driver's face, the position of the representative moving object detected by the outside-vehicle information detection unit 141 and the direction of the driver's face detected by the inside-vehicle information detection unit 142 are mapped to a situational awareness map that is also the spatial information. As a result, the position of the representative moving object and the direction of the driver's face that have different coordinate axes can be indicated on the same coordinate axis.

Further, in determining whether or not the representative moving object is present in the direction of the driver's face, the case where the representative moving object is present in a predetermined range around the direction of the driver's face is determined as the case where the representative moving object is present in the direction of the driver's face. Consequently, the range in which the driver can be aware of an object is determined as the face direction. As a result, it is possible to determine whether or not the driver is aware of the representative moving object depending on whether or not the representative moving object is present in the predetermined range around the face direction.

The direction of the driver's face is detected by a TOF sensor. This makes it possible to accurately monitor the direction of the driver's face even at night or in the dark in a tunnel.

Further, in selecting the notification content to the driver, the notification content can be changed not only when the representative moving object is present in the direction of the driver's face, but also according to the degree of safety indicating the possibility of the representative moving object colliding with the host vehicle. For example, the notification content for making the driver be aware of the representative moving object is selected and output according to a combination of the degree of safety and the presence or absence of the representative moving object in the direction of the driver's face. Consequently, when the degree of safety is medium and the representative moving object is not present in the direction of the driver's face, the notification is given, for example, a stronger notification sound as compared with the case where the representative moving object is present in the direction of the driver's face is output. As a result, when the degree of safety is medium and the representative moving object is present in the direction of the driver's face, the notification is given so as not to bother the driver, but when the representative moving object is not present in the direction of the driver's face, the notification is given so as to draw attention to the driver.

In addition, in the case of a high degree of safety, the notification is given, for example, a weaker notification sound as compared with the case where the degree of safety is medium and the representative moving object is present in the direction of the driver's face is output. As a result, it is possible to draw attention within a range that does not bother the driver, and even if the driver is not aware of the representative moving object, the driver can be given attention to the representative moving object.

Further, in the case of a low degree of safety, the notification is given, for example, a stronger notification sound as compared with the case where the degree of safety is medium and the representative moving object is not present in the direction of the driver's face is output. Consequently, a strong notification is given not only when the representative moving object is not present in the direction of the driver's face but also when the representative moving object is present in the direction of the driver's face. As a result, it is possible to warn the driver that the possibility of the representative moving object colliding with the host vehicle is imminent. At this time, the acceleration/deceleration control unit 172 performs a brake operation, a steering wheel operation, or the like in order to avoid an emergency. As a result, it is possible to avoid the collision of the representative moving object with the host vehicle and to soften the impact of the collision.

In addition, the output control unit 105 stops the output of the notification content at a predetermined timing after the notification content is output. The predetermined timing may be, for example, when the direction of the driver's face matches the position of the representative moving object, or when a voice indicating that the driver is aware of the representative moving object is detected, or when the driver operates the steering wheel or the brake. When the possibility of the representative moving object colliding with the host vehicle, which causes the notification content, disappears, the notification is stopped. As a result, it is possible to reduce the annoyance given to the driver as compared with the case where the notification is continued even after the possibility of the representative moving object colliding with the host vehicle, which causes the notification content, disappears.

The output control unit 105 outputs a notification sound in the sound image localization. The direction of the notification sound in the vehicle felt by the driver thus matches the direction of the representative moving object. As a result, the driver can recognize the position of the direction of the representative moving object by the sound. In addition, the driver can grasp the position of the representative moving object in a short time as compared with the case of blindly searching for the position of the representative moving object.

When there are a plurality of moving objects around the host vehicle, the moving object with the shortest TTC is used as the representative moving object. Consequently, the moving object that is likely to collide at the earliest time at that time is targeted for the driver's awareness. Since the moving object that is more likely to collide than the moving object that is less likely to collide is targeted for the driver's awareness, the safety for the driver can be improved.

Modification of Embodiment

Figure 10:
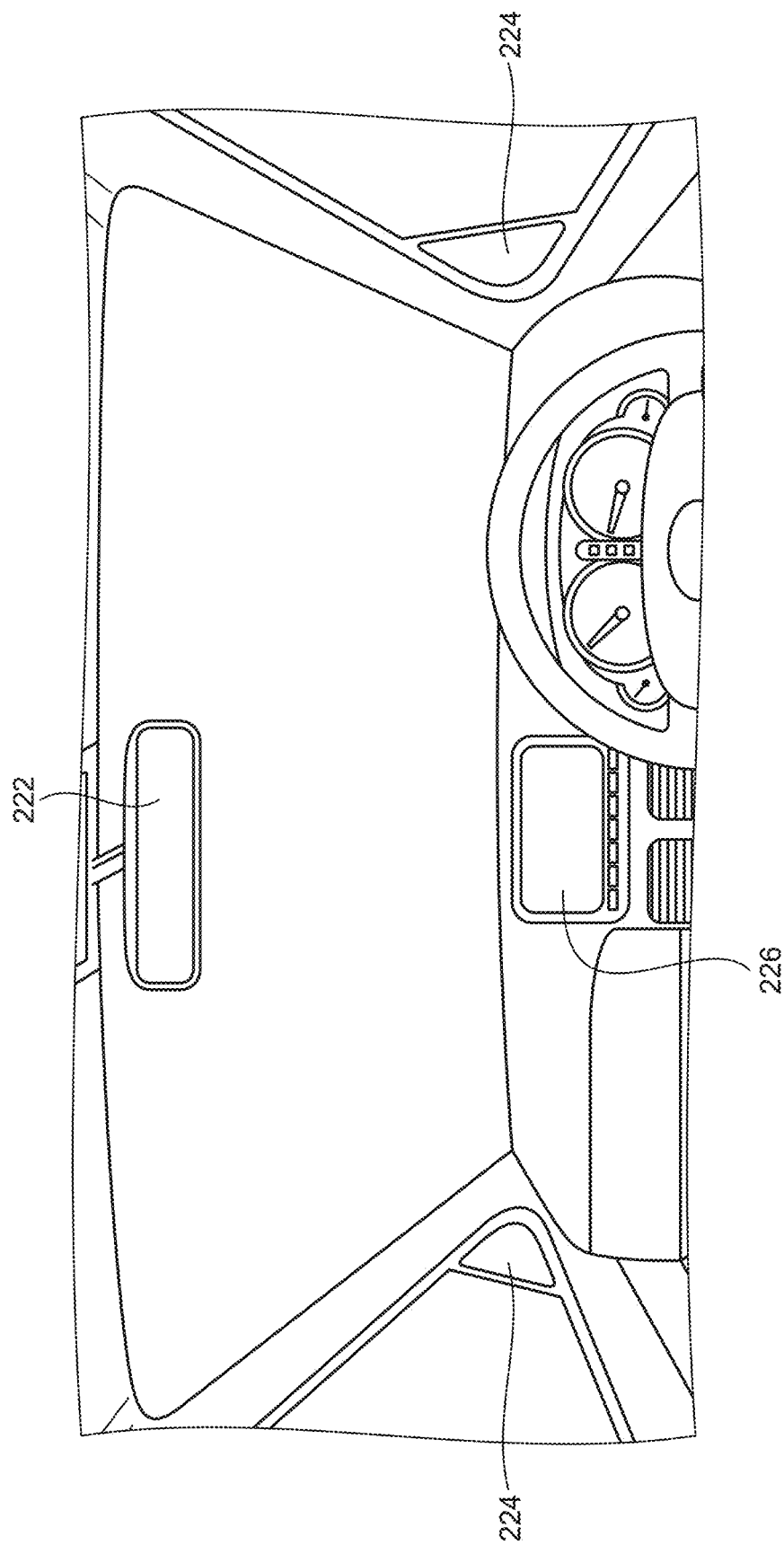
FIG. 10 is a view illustrating an example of an arrangement position of a display device in a vehicle.

It is assumed in the above description that the driver's face is outward through a window. However, the driver may see not only the external scenery through a windshield, but also an electronic rearview mirror, an electronic side mirror, or a display device in a vehicle, the display device displaying an image behind a vehicle when the vehicle is retracted. FIG. 10 is a view illustrating an example of an arrangement position of a display device in a vehicle. An electronic rearview mirror 222 is a display device that displays an image captured by an image capturing device provided at the rear of the vehicle, and is provided near the center of the top of the windshield. The electronic rearview mirror 222 has the same function as a rearview mirror. Information behind the vehicle is displayed on the electronic rearview mirror 222. Electronic side mirrors 224 are, for example, display devices that display images captured by the image capturing devices 7912 and 7914 respectively provided on the outer side surface of the vehicle illustrated in FIG. 2A, and have the same function as a side mirror. The electronic side mirror 224 is provided, for example, near the front of a front door window. Information on the rear side surface of the vehicle is displayed on the electronic side mirror 224. A display device 226 for a car navigation system displays not only map information but also an image captured by the image capturing device 7916 on a back door or a back bumper illustrated in FIG. 2A when the vehicle moves backward, for example. Here, a modification of the information processing device that is capable of determining whether or not the driver is aware of a representative moving object moved to a display device that displays the outside of the vehicle will be described.

In this modification, the situation awareness unit 153 detects whether the face direction is outside the vehicle or inside the vehicle from the inside-vehicle information detection unit 142. When the face direction is outside the vehicle, as described in the embodiment, the situation awareness unit 153 uses the results of detection by the outside-vehicle information detection unit 141 as a situational awareness map, and maps the direction of the driver's face to the situational awareness map. On the other hand, when the face direction is toward the display device in the vehicle, the situation awareness unit 153 uses the image data of the inside of the vehicle front portion (hereinafter, referred to as "in-vehicle front image") as the situational awareness map. The in-vehicle front image may be an image in which the area including the windshield, the electronic rearview mirror 222, the electronic side mirror 224, and the display device 226 for a car navigation system is captured, as illustrated in FIG. 10, for example, or may be image data captured without the driver. At this time, the situation awareness unit 153 displays the captured data outside the vehicle at that time at the position of each display device in the in-vehicle front image, and maps the direction of the driver's face. The determination unit 155 then determines whether the representative moving object in the display device is within the range of awareness of the driver. Since other configurations are similar to those described in the embodiment, the configurations will be omitted.

Figure 11:
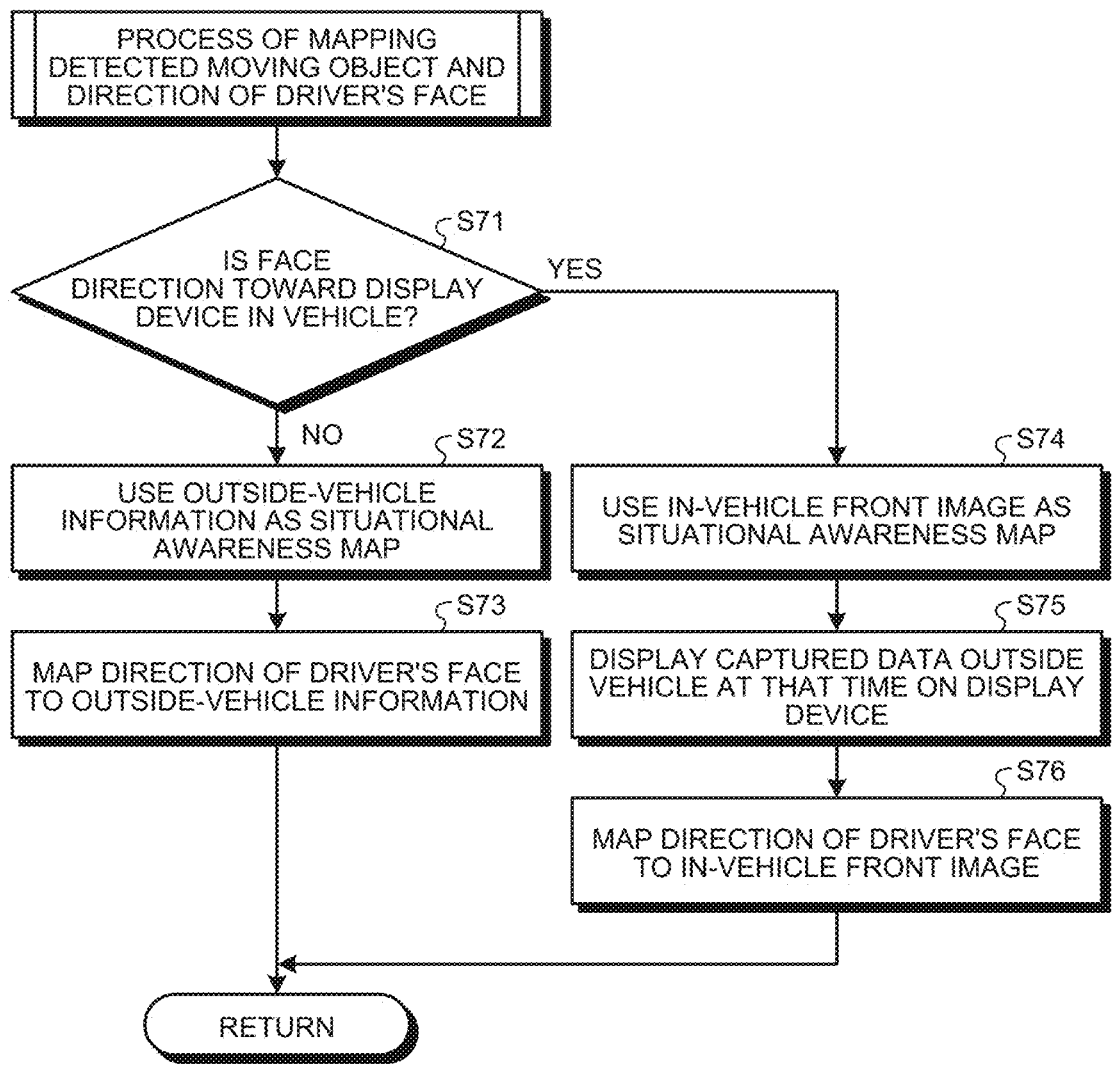
FIG. 11 is a flowchart illustrating an example of a process procedure for mapping a detected moving object and the direction of a driver's face according to a modification of the embodiment.

In the modification, the process at Step S17 in the flowchart of FIG. 4 is different from that of the embodiment. FIG. 11 is a flowchart illustrating an example of a process procedure for mapping a detected moving object and the direction of a driver's face according to the modification of the embodiment.

In the process of mapping the detected moving object and the direction of the driver's face, the situation awareness unit 153 first determines whether the direction of the driver's face is toward the inside of the vehicle based on the information from the inside-vehicle information detection unit 142 (Step S71). When the face direction is not toward the inside of the vehicle (No at Step S71), the situation awareness unit 153 uses the outside-vehicle information indicating the external position of a host vehicle acquired by the data acquisition unit 102 as a situational awareness map (Step S72), maps the direction of the driver's face to the outside-vehicle information (Step S73), and the process returns to FIG. 4.

When the face direction is toward the inside of the vehicle (Yes at Step S71), the situation awareness unit 153 uses an in-vehicle front image as the situational awareness map (Step S74). The situation awareness unit 153 superimposes the captured data outside the vehicle at that time on the position of each display device in the in-vehicle front image, and displays the resultant image (Step S75). When the in-vehicle front image at that time is being captured, the process at Step S75 is not necessary. The direction of the driver's face is then mapped to the in-vehicle front image (Step S76), and the process returns to FIG. 4. Since other processes are similar to those described in the embodiment, the processes will be omitted.

Figure 12:
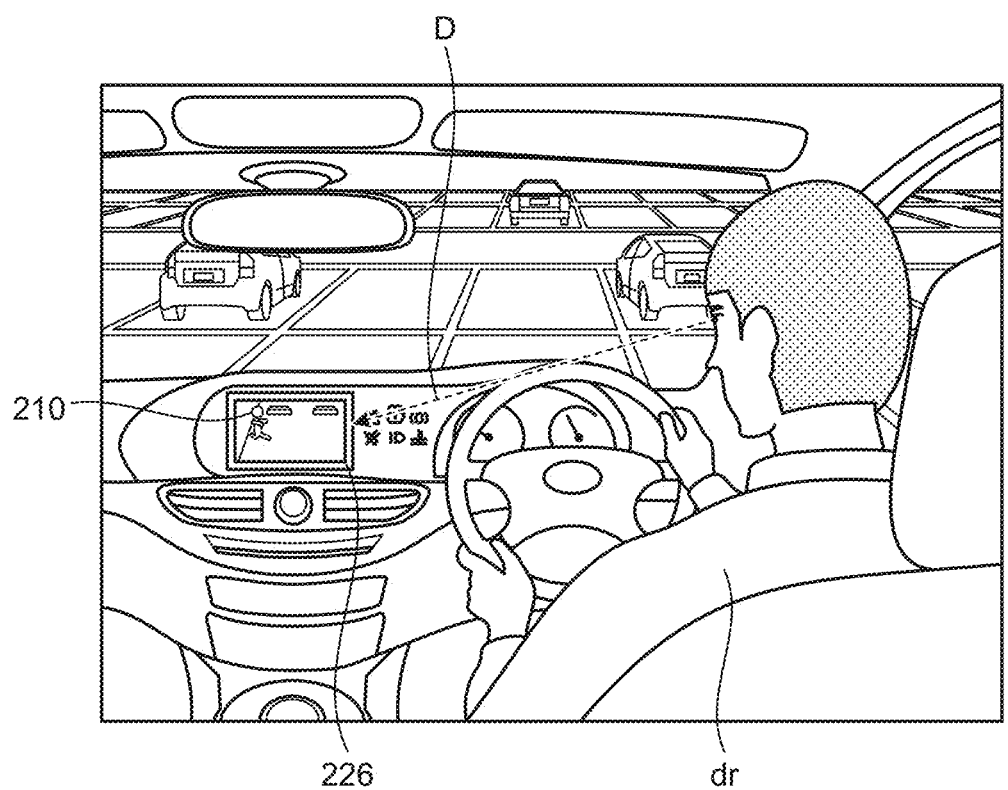
FIG. 12 is a view illustrating an example of the direction of a driver's face according to the modification of the embodiment.

FIG. 12 is a view illustrating an example of the direction of a driver's face according to the modification of the embodiment. Here, it is assumed that the vehicle is moving backward and the display device 226 for a car navigation system in the vehicle displays an image behind the vehicle. The moving object 210 is displayed in the image of the display device 226.

As illustrated in this figure, the face direction D of the driver dr is toward the display device 226 in the vehicle. In this case, the moving object 210 (representative moving object) detected by the outside-vehicle information detection unit 141 and the face direction D of the driver detected by the inside-vehicle information detection unit 142 are mapped to the situational awareness map illustrated in FIG. 12 by the situation awareness unit 153. In this case, since the face direction D of the driver dr is toward the position of the display device 226 in the vehicle, the determination unit 155 determines that the driver dr is aware of the moving object 210. Then, the determination unit 155 determines the notification content according to a combination of the degree of safety of the moving object 210 and the degree to which the driver dr is aware of the representative moving object 210.

In the above description, the case where the direction of the driver's face is detected by a DMS provided in the vehicle has been described. However, a line-of-sight sensor that directly detects the direction of the driver's line of sight instead of the direction of the driver's face may be used as the DMS. By using the line-of-sight sensor, the driver's line-of-sight direction can be detected with higher accuracy. The line of sight through a window and the line of sight of the display device in the vehicle can be easily distinguished. Further, the distinction between the line of sight through the window and the line of sight of the display device in the vehicle may be determined by the focal length of the eyes.

Not only the DMS that recognizes the driver's face may be disposed on the dashboard 5010 above the instrument panel 5020 in FIG. 2B, but also a plurality of DMSs may be disposed so as to recognize the driver's face when the driver looks sideways or looks back. As a result, when the driver's face cannot be recognized by the DMS on the dashboard 5010 for example, the driver's face is recognized by using another DMS, and the direction of the driver's face captured by another DMS may be mapped to a situational awareness map.

In the modification, the display device in the vehicle displays an image captured by a camera monitoring system (hereinafter referred to as CMS) such as a side camera on the side surface of the vehicle or a back camera at the rear of the vehicle. When a representative moving object is present in the image captured by the CMS, it is determined whether or not the direction of the driver's face is toward the display device in the vehicle. The in-vehicle front image is then used as a situation checking map, and the image captured by the CMS at that time is fitted into the display device in this situational awareness map. The degree to which the driver is aware of the representative moving object is determined based on whether or not a moving object in the image on the display device is present in the direction of the driver's face. It is thus determine the degree to which the driver is aware of not only the moving object that is present in front of the driver but also the moving object that is present on the side of the driver or behind the driver and is displayed on the display device. As a result, the driver can be alerted to the representative moving object that is present on the side of the driver or behind the driver.

Further, in the modification, it is determined whether or not the display area of the representative moving object captured by the CMS is in the direction of the driver's face. When the display area of the representative moving object is not in the direction of the driver's face, it is determined that the driver is not aware of the representative moving object.

As a result, if the display area of the representative moving object is not in the direction of the face even when the driver looks at the display device in the vehicle, it is possible to draw attention to the driver.

Further, the line of sight can be detected as the direction of the driver's face by a line-of-sight sensor. In this case, it is possible to more accurately specify whether the driver is looking at the outside through the windshield or the display device in the vehicle. In addition, the position of the driver's line of sight in the display device can be specified with high accuracy, and the notification content to be notified to the driver can be brought closer to that according to the awareness of the driver.

The technique according to the present disclosure (present technique) can be applied not only to automobiles but also to various other products. For example, the technique according to the present disclosure may be achieved as a device mounted on any type of moving bodies such as electric vehicles, hybrid electric vehicles, motorcycles, bicycles, personal mobilities, airplanes, drones, ships, and robots.

Hardware Configuration of Information Processing Device According to Embodiment

Figure 13:
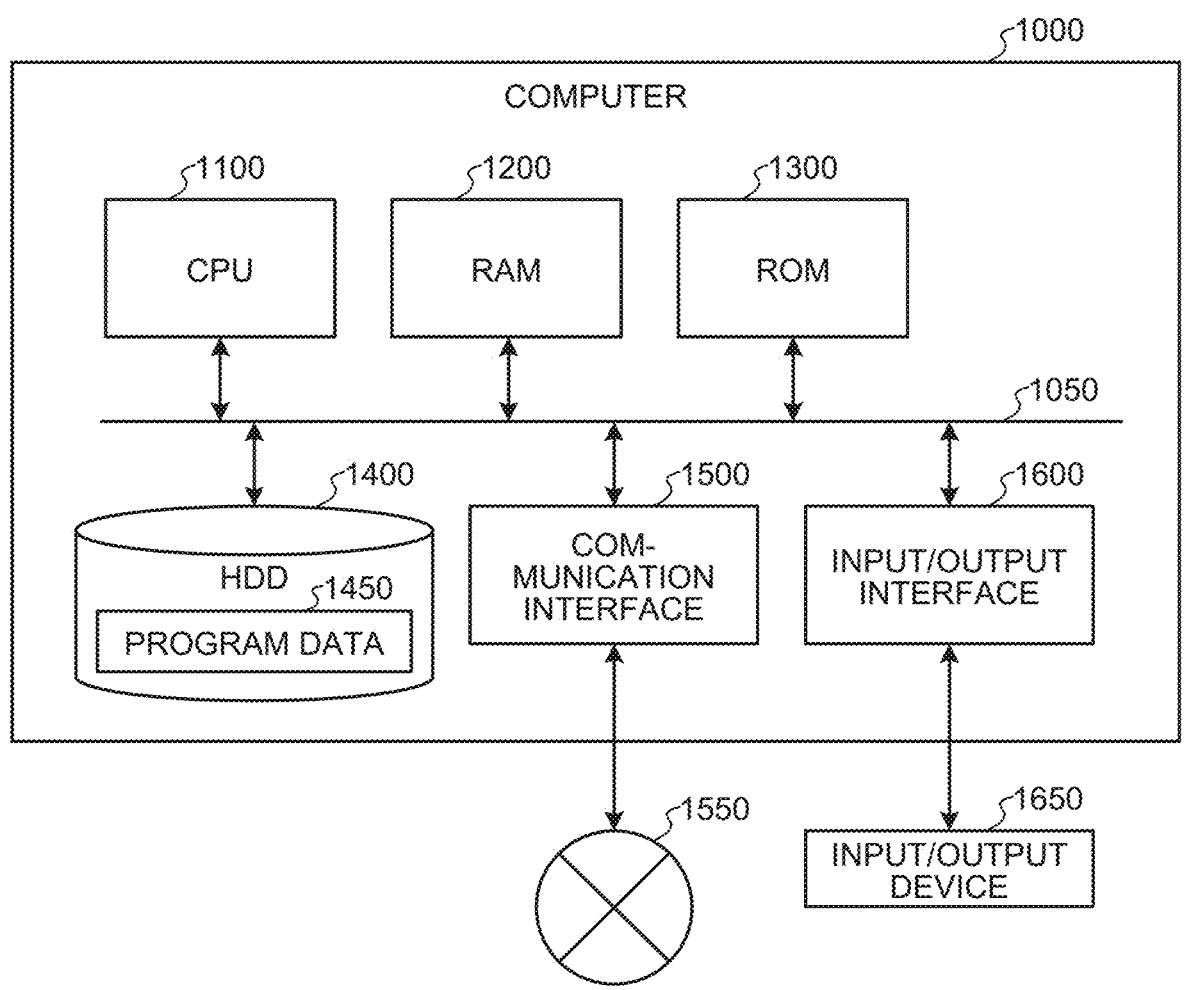
FIG. 13 is a hardware configuration diagram illustrating an example of a computer that implements the function of an information processing device according to the embodiment.

FIG. 13 is a hardware configuration diagram illustrating an example of a computer that implements the function of an information processing device according to the embodiment. The information processing device including the self-driving control unit 112, the output control unit 105, the output unit 106, and the storage unit 111 according to the embodiment described above is implemented by a computer 1000. The computer 1000 includes a CPU 1100, a RAM 1200, a read only memory (ROM) 1300, a hard disk drive (HDD) 1400, a communication interface 1500, and an input/output interface 1600. The respective units of the computer 1000 are connected by a bus 1050.

The CPU 1100 operates based on a program stored in the ROM 1300 or the HDD 1400, and controls the respective units. For example, the CPU 1100 loads the program stored in the ROM 1300 or the HDD 1400 into the RAM 1200, and performs processing corresponding to various programs.

The ROM 1300 stores a boot program such as a basic input output system (BIOS) executed by the CPU 1100 when the computer 1000 stars up and a program that depends on the hardware of the computer 1000.

The HDD 1400 is a computer-readable recording medium that non-temporarily records a program executed by the CPU 1100 and data used in this program. Specifically, the HDD 1400 is a recording medium that records an information processing program according to the present disclosure, which is an example of program data 1450.

The communication interface 1500 is an interface for connecting the computer 1000 to an external network 1550 (for example, Internet). For example, the CPU 1100 receives data from another device or transmits the data generated by the CPU 1100 to another device through the communication interface 1500.

The input/output interface 1600 is an interface for connecting an input/output device 1650 to the computer 1000. For example, the CPU 1100 receives data from an input device such as a keyboard or mouse through the input/output interface 1600. The CPU 1100 also transmits data to an output device such as a display, a speaker, or a printer through the input/output interface 1600. Further, the input/output interface 1600 may function as a media interface for reading a program or the like recorded in a predetermined recording medium (medium). The medium is, for example, an optical recording medium such as a digital versatile disk (DVD) or a phase change rewritable disk (PD), a magneto-optical recording medium such as a magneto-optical disk (MO), a tape medium, a magnetic recording medium, or a semiconductor memory.

For example, when the computer 1000 functions as the information processing device according to the embodiment, the CPU 1100 of the computer 1000 executes an information processing program loaded on the RAM 1200 to implement functions such as the detection unit 131, the situation analysis unit 133, the operation control unit 135, and the output control unit 105. The information processing program according to the present disclosure is stored in the HDD 1400. The CPU 1100 reads the program data 1450 from the HDD 1400 and performs the program data. However, as another example, these programs may be acquired from another device through the external network 1550.

It should be noted that the effects described in the present specification are merely examples and are not limited, and other effects may be obtained.

The present technique may also be configured as follows.

(1)

An information processing device comprising:

an external information detection unit that detects an object that is present outside a moving body based on data detected by an external detection unit;

an internal information detection unit that detects a direction of a driver's face inside the moving body based on data detected by an internal detection unit;

a determination unit that determines whether a position of the object detected by the external information detection unit and the direction of the driver's face detected by the internal information detection unit are in a same direction; and an output control unit that outputs an alert to a driver more strongly when the position of the object is not in the same direction as the direction of the driver's face, as compared to a case where the position of the object is in the same direction as the direction of the driver's face.

(2)

The information processing device according to (1), further comprising a situation awareness unit that maps the position of the object detected by the external information detection unit and the direction of the driver's face detected by the internal information detection unit to same spatial information, wherein the determination unit determines whether the position of the object and the direction of the driver's face are in the same direction by using the spatial information mapped.

(3)

The information processing device according to (2), wherein when the position of the object is present in a predetermined range around the direction of the driver's face, the determination unit determines that the position of the object and the direction of the driver's face are in the same direction.

(4)

The information processing device according to (1), further comprising a display unit that displays image data captured by the external detection unit provided on a side surface of the moving body or at rear of the moving body, wherein the determination unit makes a determination using the direction of the driver's face on the display unit.

(5)

The information processing device according to (4), wherein the determination unit determines whether the position of the object in the image data displayed on the display unit and the direction of the driver's face are same.

(6)

The information processing device according to (5), wherein the internal information detection unit detects a line of sight of the driver as the direction of the driver's face, and the determination unit determines a distinction between the line of sight through a window and the line of sight to the display unit at a position of the line of sight of the driver.

(7)

The information processing device according to any one of (1) to (6), wherein the internal detection unit is a TOF sensor.

(8)

The information processing device according to any one of (1) to (7), further including a situation prediction unit that predicts a collision prediction time of the object colliding with the moving body based from a motion of the moving body and a motion of the object, and that classifies the object according to a degree of safety that is determined by a length of the collision prediction time, in which the output control unit sets an alert in a case where the degree of safety is medium and the position of the object is not in the same direction as the direction of the driver's face to be larger than an alert in a case where the position of the object is in the same direction as the direction of the driver's face.

(9)

The information processing device according to (8), in which the output control unit sets an alert in a case where the degree of safety is low to be larger than an alert in a case where the degree of safety is medium and the position of the object is not in the same direction as the direction of the driver's face, regardless of whether or not the position of the object is in the same direction as the direction of the driver's face.

(10)

The information processing device according to any one of (1) to (9), in which the output control unit stops output of the alert at a predetermined timing after the alert is output.

(11)

The information processing device according to (10), in which the predetermined timing is a timing when the determination unit determines that the direction of the driver's face is toward a direction of the object, a voice indicating that the driver is aware of the object is emitted, or the driver operates a steering wheel or a brake.

(12)

The information processing device according to any one of (1) to (11), in which the output control unit outputs a notification sound as the alert, and performs a sound image localization process on the notification sound so as to allow a sound image to be placed at a position of the object as viewed from the driver.

(13)

The information processing device according to any one of (1) to (12), in which when a plurality of the objects are detected by the external information detection unit, the determination unit determines whether a position of an object with a shortest time to collide with the moving body and the direction of the driver's face are in the same direction.

(14)

A moving body comprising:

an external detection unit that detects an object that is present outside the moving body;

an internal detection unit that detects a driver inside the moving body;

an external information detection unit that detects the object based on data detected by the external detection unit;

an internal information detection unit that detects a direction of a driver's face based on data detected by the internal detection unit;

a determination unit that determines whether a position of the object detected by the external information detection unit and the direction of the driver's face detected by the internal information detection unit are in a same direction; and an output control unit that outputs an alert to the driver more strongly when the position of the object is not in the same direction as the direction of the driver's face, as compared to a case where the position of the object is in the same direction as the direction of the driver's face.

(15)

An information processing method comprising:

detecting an object that is present outside a moving body based on data detected by an external detection unit;

detecting a direction of a driver's face inside the moving body based on data detected by an internal detection unit;

determining whether a position of the object and the direction of the driver's face are in a same direction; and outputting an alert to a driver more strongly when the position of the object is not in the same direction as the direction of the driver's face, as compared to a case where the position of the object is in the same direction as the direction of the driver's face.

(16)

A program that causes a computer to perform a step of detecting an object that is present outside a moving body based on data detected by an external detection unit;

a step of detecting a direction of a driver's face inside the moving body based on data detected by an internal detection unit;

a step of determining whether a position of the object and the direction of the driver's face are in a same direction; and a step of outputting an alert to a driver more strongly when the position of the object is not in the same direction as the direction of the driver's face, as compared to a case where the position of the object is in the same direction as the direction of the driver's face.

REFERENCE SIGNS LIST

100 VEHICLE CONTROL SYSTEM
101 INPUT UNIT
102 DATA ACQUISITION UNIT
105 OUTPUT CONTROL UNIT
106 OUTPUT UNIT
107 DRIVE-SYSTEM CONTROL UNIT
108 DRIVE-SYSTEM SYSTEM
109 BODY-SYSTEM CONTROL UNIT
110 BODY-SYSTEM SYSTEM
111 STORAGE UNIT
112 SELF-DRIVING CONTROL UNIT
121 COMMUNICATION NETWORK
131 DETECTION UNIT
133 SITUATION ANALYSIS UNIT
134 PLANNING UNIT
135 OPERATION CONTROL UNIT

141 OUTSIDE-VEHICLE INFORMATION DETECTION UNIT
142 INSIDE-VEHICLE INFORMATION DETECTION UNIT
143 VEHICLE STATE DETECTION UNIT
153 SITUATION AWARENESS UNIT
154 SITUATION PREDICTION UNIT
155 DETERMINATION UNIT
171 EMERGENCY AVOIDANCE UNIT
172 ACCELERATION/DECELERATION CONTROL UNIT
173 DIRECTION CONTROL UNIT
210 REPRESENTATIVE MOVING OBJECT
222 ELECTRONIC REARVIEW MIRROR
224 ELECTRONIC SIDE MIRROR
226 DISPLAY DEVICE
5010 DASHBOARD
5020 INSTRUMENT PANEL
5030 DMS

The invention claimed is:

1. An information processing device comprising:
   circuitry configured to function as:
   an external information detection unit that detects an object that is present outside a moving body based on data detected by an external detection unit;
   an internal information detection unit that detects a direction of a driver's face inside the moving body based on data detected by an internal detection unit;
   a determination unit that determines whether a position of the object detected by the external information detection unit and the direction of the driver's face detected by the internal information detection unit are within 35 degrees of each other; and
   an output control unit that outputs an alert to a driver more strongly when the position of the object is not within 35 degrees of the direction of the driver's face, as compared to a case where the position of the object is within 35 degrees of the direction of the driver's face.

2. The information processing device according to claim 1, wherein the circuitry is further configured to function as:
   a situation awareness unit that maps the position of the object detected by the external information detection unit and the direction of the driver's face detected by the internal information detection unit to same spatial information, wherein
   the determination unit determines whether the position of the object and the direction of the driver's face are within 35 degrees of each other by using the spatial information mapped.

3. The information processing device according to claim 2, wherein when the position of the object is present in a predetermined range around the direction of the driver's face, the determination unit determines that the position of the object and the direction of the driver's face are within 35 degrees of each other.

4. The information processing device according to claim 1, wherein the circuitry is further configured to function as:
   a display unit that displays image data captured by the external detection unit provided on a side surface of the moving body or at rear of the moving body, wherein
   the determination unit makes a determination using the direction of the driver's face on the display unit.

5. The information processing device according to claim 4, wherein the determination unit determines whether the position of the object in the image data displayed on the display unit and the direction of the driver's face are same.

6. The information processing device according to claim 5, wherein
   the internal information detection unit detects a line of sight of the driver as the direction of the driver's face, and
   the determination unit determines a distinction between the line of sight through a window and the line of sight to the display unit at a position of the line of sight of the driver.

7. The information processing device according to claim 1, wherein the internal detection unit is a TOF sensor.

8. A moving body comprising:
   circuitry configured to function as:
   an external detection unit that detects an object that is present outside the moving body;
   an internal detection unit that detects a driver inside the moving body;
   an external information detection unit that detects the object based on data detected by the external detection unit;
   an internal information detection unit that detects a direction of a driver's face based on data detected by the internal detection unit;
   a determination unit that determines whether a position of the object detected by the external information detection unit and the direction of the driver's face detected by the internal information detection unit are within 35 degrees of each other; and
   an output control unit that outputs an alert to the driver more strongly when the position of the object is not within 35 degrees of the direction of the driver's face, as compared to a case where the position of the object is within 35 degrees of the direction of the driver's face.

9. An information processing method comprising:
   detecting an object that is present outside a moving body based on data detected by an external detection unit;
   detecting a direction of a driver's face inside the moving body based on data detected by an internal detection unit;
   determining whether a position of the object and the direction of the driver's face are within 35 degrees of each other; and
   outputting an alert to a driver more strongly when the position of the object is not within 35 degrees of the direction of the driver's face, as compared to a case where the position of the object is within 35 degrees of the direction of the driver's face.

10. A non-transitory computer-readable storage medium storing processor-executable instructions that, when executed by at least one processor, cause the at least one processor to carry out a method, the method comprising:
    detecting an object that is present outside a moving body based on data detected by an external detection unit;
    detecting a direction of a driver's face inside the moving body based on data detected by an internal detection unit;
    determining whether a position of the object and the direction of the driver's face are within 35 degrees of each other; and
    outputting an alert to a driver more strongly when the position of the object is not within 35 degrees of the direction of the driver's face, as compared to a case where the position of the object is within 35 degrees of the direction of the driver's face.

* * * * *